(12) United States Patent
Wang et al.

(10) Patent No.: US 9,433,941 B2
(45) Date of Patent: Sep. 6, 2016

(54) MICROFLUIDIC CHIP HAVING ON-CHIP ELECTRICALLY TUNABLE HIGH-THROUGHPUT NANOPHOTONIC TRAP

(71) Applicant: Cornell University, Ithaca, NY (US)

(72) Inventors: Michelle D. Wang, Ithaca, NY (US); Michal Lipson, Ithaca, NY (US); Mohammad Soltani, Ithaca, NY (US); Jun Lin, New York, NY (US); Summer N. Saraf, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/654,839

(22) PCT Filed: Dec. 23, 2013

(86) PCT No.: PCT/US2013/077616
§ 371 (c)(1),
(2) Date: Jun. 22, 2015

(87) PCT Pub. No.: WO2014/100831
PCT Pub. Date: Jun. 26, 2014

(65) Prior Publication Data
US 2015/0336097 A1    Nov. 26, 2015

Related U.S. Application Data

(60) Provisional application No. 61/745,460, filed on Dec. 21, 2012.

(51) Int. Cl.
| | |
|---|---|
| *G01N 15/06* | (2006.01) |
| *G01N 33/00* | (2006.01) |
| *G01N 33/48* | (2006.01) |
| *B01L 3/00* | (2006.01) |
| *B82Y 20/00* | (2011.01) |
| *G02B 6/12* | (2006.01) |

(52) U.S. Cl.
CPC .... *B01L 3/502761* (2013.01); *B01L 3/502715* (2013.01); *B01L 2200/0668* (2013.01);
(Continued)

(58) Field of Classification Search
CPC ...... G01N 15/06; G01N 33/00; G01N 33/48; B01L 3/00
USPC .......... 422/68.1, 502, 503, 504, 81, 82, 527; 436/43, 175, 177, 180, 164, 171, 172; 977/932
See application file for complete search history.

(56) References Cited

U.S. PATENT DOCUMENTS

| | | | |
|---|---|---|---|
| 7,081,192 B1* | 7/2006 | Wang et al. | 204/547 |
| 7,384,797 B1* | 6/2008 | Blair | 436/524 |

(Continued)

FOREIGN PATENT DOCUMENTS

WO    2010141365 A2    12/2010

OTHER PUBLICATIONS

Soltani, M. et al., "Electro-Aptofluidics: Achieving Dynamic Control On-Chip," Optics Express, 20 (20):22314-22326, Sep. 24, 2012.

*Primary Examiner* — Brian J Sines
(74) *Attorney, Agent, or Firm* — Perkins Coie LLP

(57) ABSTRACT

In one implementation, a microfluidic device based on optical trapping of particles is disclosed to include a substrate structured to include a fluidic channel which can carry a fluid having particles; and an optical waveguide loop formed on the substrate to include one or more waveguide sections that reside within the fluidic channel, an input optical port for the optical waveguide to receive an input optical beam, and an optical power splitter coupled to the optical waveguide loop to split the received input optical beam into two counter-propagating optical beams that progate in the optical waveguide loop in opposite directions and interfere with each other to form standing optical waves in at least the one or more waveguide sections that reside within the fluidic channel to optically trap particles at or near a surface of the one or more waveguide sections that reside within the fluidic channel. This device further includes an electrically controllable phase control device formed on the substrate and coupled to a location of the optical waveguide loop and operable to control an optical delay experienced by guided light at the coupled location, wherein the electrically controllable phase control device is configured to respond to an electrical control signal to adjust an amount of the optical delay at the coupled location to cause a shift in locations of nodes of each optical standing wave to change trapping locations of the trapped particles in the fluidic channel.

33 Claims, 14 Drawing Sheets

(52) U.S. Cl.
CPC . *B01L2300/0654* (2013.01); *B01L 2300/0816* (2013.01); *B01L 2300/168* (2013.01); *B01L 2400/0454* (2013.01); *B82Y 20/00* (2013.01); *G02B 2006/12159* (2013.01); *Y10T 436/25375* (2015.01)

(56) References Cited

U.S. PATENT DOCUMENTS

| | | | |
|---|---|---|---|
| 7,444,053 B2 * | 10/2008 | Schmidt et al. | 385/129 |
| 7,515,804 B2 * | 4/2009 | Kittaka et al. | 385/131 |
| 7,825,380 B2 * | 11/2010 | Puscasu et al. | 250/336.1 |
| 7,995,890 B2 * | 8/2011 | Schmidt et al. | 385/129 |
| 9,057,825 B2 * | 6/2015 | Erickson et al. | |
| 2002/0181837 A1 * | 12/2002 | Wang et al. | 385/16 |
| 2006/0171846 A1 | 8/2006 | Marr et al. | |
| 2007/0036479 A1 * | 2/2007 | Beausoleil | 385/12 |
| 2009/0175586 A1 * | 7/2009 | Schmidt et al. | 385/132 |
| 2010/0124787 A1 | 5/2010 | Nitkowski et al. | |
| 2011/0174961 A1 | 7/2011 | Kishan et al. | |
| 2013/0182995 A1 * | 7/2013 | Erickson et al. | 385/14 |

* cited by examiner

MICROFLUIDIC CHIP HAVING ON-CHIP ELECTRICALLY TUNABLE HIGH-THROUGHPUT NANOPHOTONIC TRAP

PRIORITY CLAIM AND RELATED PATENT APPLICATION

This document is a 35 USC §371 National Stage application of International Application No. PCT/US2013/077616 filed Dec. 23, 2013, which claims priority of U.S. Provisional Application No. 61/745,460, entitled "MICROFLUIDIC CHIP HAVING ON-CHIP ELECTRICALLY TUNABLE HIGH-THROUGHPUT NANOPHOTONIC TRAP" and filed Dec. 21, 2012, the entire disclosures of which are incorporated by reference as part of this patent document.

BACKGROUND

This patent document relates to optical manipulation of particles suspended in fluid in a microfluidic device for sensing, characterizing, manipulating, sorting or interacting with various particles including molecules, molecule clusters and chemical or biological objects.

SUMMARY

This patent document includes techniques and devices for optical trapping or manipulation of particles suspended in fluid in a microfluidic device for sensing, characterizing, manipulating, sorting or interacting with various particles including molecules, molecule clusters and chemical or biological objects. An input optical beam is used to generate two counter propagating beams in an optical waveguide section to form a standing optical wave for optically trapping particles in the liquid at or near the surface of the optical waveguide section and to move the trapped particles along the optical waveguide section by shifting the positions of the nodes of the optical standing wave.

In one implementation, for example, a microfluidic device based on optical trapping of particles is provided to include a substrate structured to include a fluidic channel which can carry a fluid having particles; an optical waveguide loop formed on the substrate to include one or more waveguide sections that reside within the fluidic channel, an input optical port for the optical waveguide to receive an input optical beam, and an optical power splitter coupled to the optical waveguide loop to split the received input optical beam into two counter-propagating optical beams that prorogate in the optical waveguide loop in opposite directions and interact with each other to form standing optical waves in at least the one or more waveguide sections that reside within the fluidic channel to optically trap particles at or near a surface of the one or more waveguide sections that reside within the fluidic channel; and an electrically controllable phase control device formed on the substrate and coupled to a location of the optical waveguide loop and operable to control an optical delay experienced by guided light at the coupled location, wherein the electrically controllable phase control device is configured to respond to an electrical control signal to adjust an amount of the optical delay at the coupled location to cause a shift in locations of nodes of each optical standing wave to change trapping locations of the trapped particles in the fluidic channel.

In another implementation, a microfluidic device based on optical trapping of particles is provided to include a substrate structured to include a fluidic region which can contain a fluid having particles and optical waveguides formed on the substrate to include (1) a first Mach-Zehnder interferometer that is located outside the fluidic region and receives an input laser beam and splits the received input laser beam into two laser beams along two different optical paths of the first Mach-Zehnder interferometer to produce a first optical beam; and (2) second Mach-Zehnder interferometers that are located inside the fluidic region and each receive a respective portion of light of the first optical beam output by the first Mach-Zehnder interferometer. Each second Mach-Zehnder Interferometer splits received light into two optical paths that are connected so that each optical path receives counter-propagating optical beams in opposite directions that interact with each other to form standing optical waves to optically trap particles. This device further includes a first electrically controllable phase control device formed on the substrate and coupled to a location of the first Mach-Zehnder interferometer and operable to control an optical delay between the two optical paths of the first Mach-Zehnder interferometer; and second electrically controllable phase control devices formed on the substrate and coupled to the second Mach-Zehnder interferometers, respectively, each second electrically controllable phase control device operable to control an optical delay between the two optical paths of a respective second Mach-Zehnder interferometer.

In yet another implementation, a method is provided for manipulating particles in a fluid based on optical trapping via evanescent fields of standing optical waves in optical waveguides. This method includes supplying a fluid having particles in a fluidic region on a substrate in which different optical waveguide sections are located to be in contact with the fluid; splitting an input optical beam into different optical beams into the different optical waveguide sections in such a way that each of the different optical waveguide sections has two counter-propagating optical beams that prorogate in opposite directions and interact with each other to form a standing optical wave to optically trap particles at or near a surface of each optical waveguide section; and controlling an amount of the optical phase delay of light at one or more locations on the substrate to cause a shift in locations of nodes of an optical standing wave in at least one optical waveguide section to change trapping locations of the trapped particles at the optical waveguide section.

These and other implementations and various features of the disclosed technology are described in greater detail in the attached drawings, the description and the claims.

BRIEF DESCRIPTION OF DRAWINGS

Figure 8:
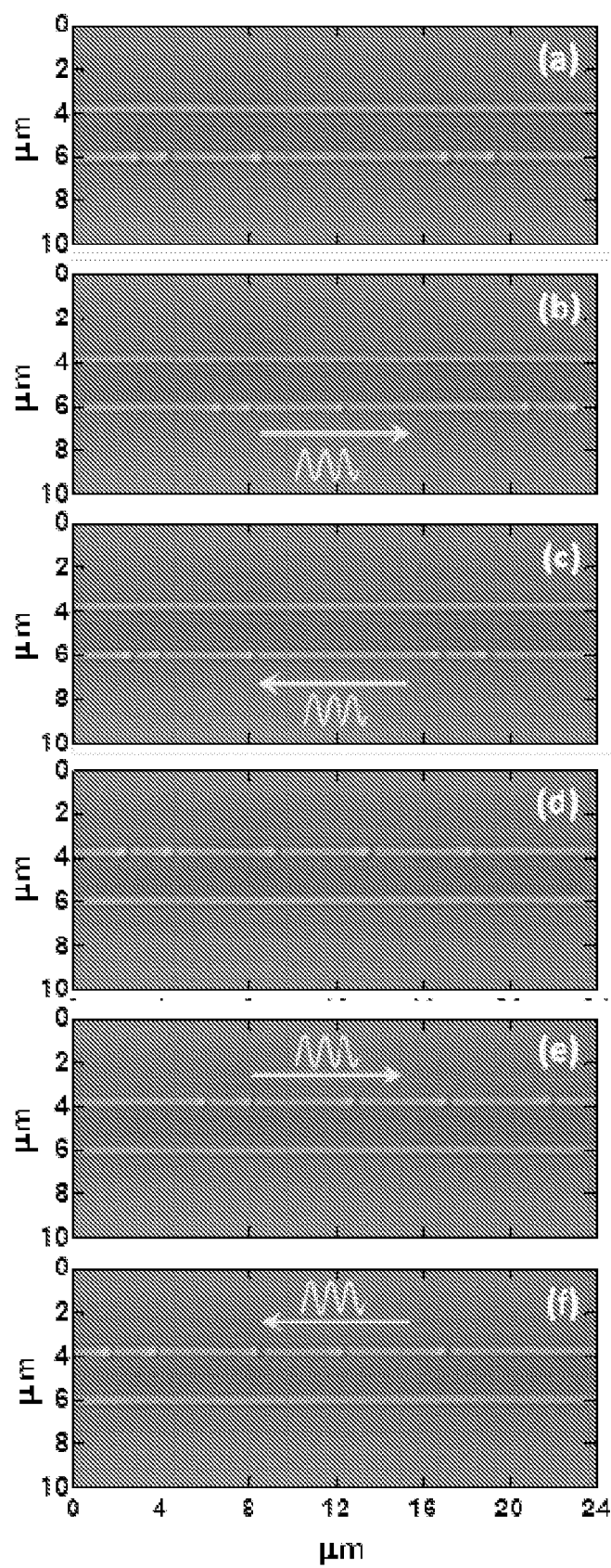

FIG. 8 shows measurements obtained in the sample device based on the implementation in FIG. 7. The figures show the trapping and manipulation of nanoparticles (356 nm in diameter) using the n-SAWT device shown in FIG. 8. Initially and by adjusting the phase-shifter $\phi_1$, the lower trapping arm is ON and the upper trapping arm is OFF. The beads are trapped in the standing-wave energy on the lower arm (frame a). Then by applying a saw-tooth pattern of voltage to the phase-shifter $\phi_3$, the trapped beads on the lower arm moves forward (frame b) and backward (frame c) along the waveguide. Later by readjusting the phase-shifter $\phi_1$, the lower trapping arm turns OFF and the upper trapping on turns ON and therefore the beads escape from the lower arm and are trapped by the upper arm (frame d). Then by applying a saw-tooth pattern of voltage, in a similar fashion as before, to the phase-shifter $\phi_2$, the trapped beads on the lower arm moves forward (frame e) and backward (frame f) along the waveguide.

Figure 7:
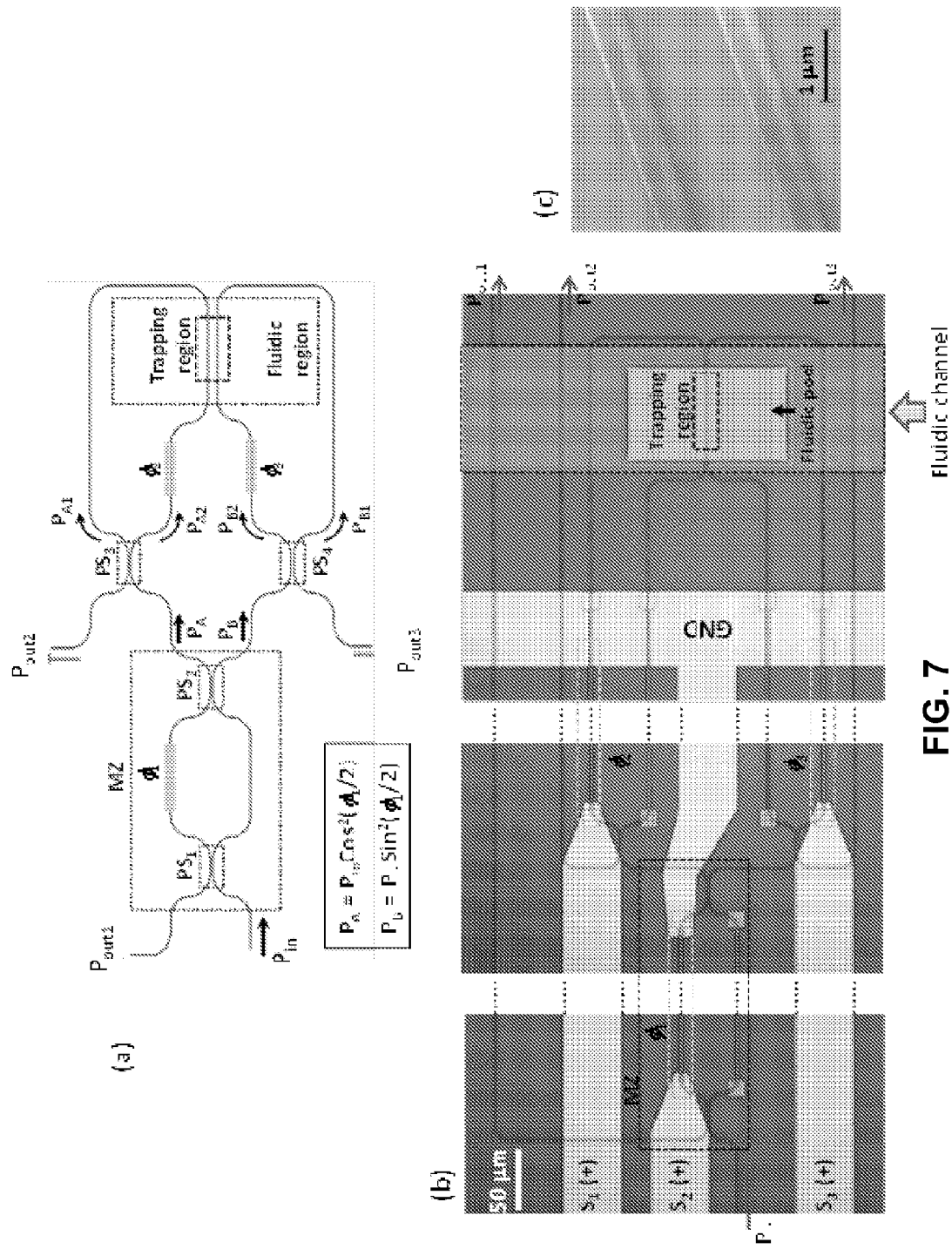
FIG. 7 shows one example of another implementation of a microfluidic chip having optical waveguides with standing optical waves for trapping and moving particles in a fluid, illustrating an n-SWAT with independently controlled trapping arms. (a) Schematic diagram of an n-SWAT device with independent control on each trapping arm. All the power splitters ($PS_1$-$PS_4$) are designed to split the powers equally. The input laser power $P_{in}$ is split into the powers $P_A$ and $P_B$. The phase of the first phase-shifter ($\phi_1$) determines the amount of $P_A$ and $P_B$. The splitter $PS_3$ splits $P_A$ equally to $P_{A1}$ and $P_{A2}$. The output ports of $PS_3$ are connected to form a loop so that $P_{A1}$ and $P_{A2}$ make a standing-wave energy pattern in the upper arm in the trapping region. In a similar manner, $P_{B1}$ and $P_{B2}$ which are the equally split of $P_B$ form a standing-wave in the lower arm in the trapping region. (b) An optical microscope view of the fabricated device. All the waveguides and the splitters dimensions are similar to the ones given in the caption FIG. 2. The three microheater phase shifters $\phi_1$, $\phi_2$, and $\phi_3$ are highlighted by yellow dashed regions. The length of the metal heaters $\phi_1$, $\phi_2$, and $\phi_3$ are 600 µm, 1.4 mm, and 1.4 mm, respectively. All the heaters are made of Ni with a thickness of 200 nm and a width of 2.5 µm. These microheaters are connected from one end to the signal metal contacts $S_1$, $S_2$, and $S_3$, respectively, and from the other end to the ground contact (GND). All optical waveguides are covered by a cladding oxide layer except the waveguides of the trapping region. For this region a window has been opened wherein the oxide layer has been removed and a fluidic pool with oxide boundaries has been formed. The trapping waveguides are at the bottom of this pool and exposed to the fluid. The location of the fluidic channel and the flow direction is also shown in this figure. (c) An electron microscope view of the waveguides in the trapping region. The spacing between these two waveguides in the trapping region is 1.8 µm.
Figure 9:
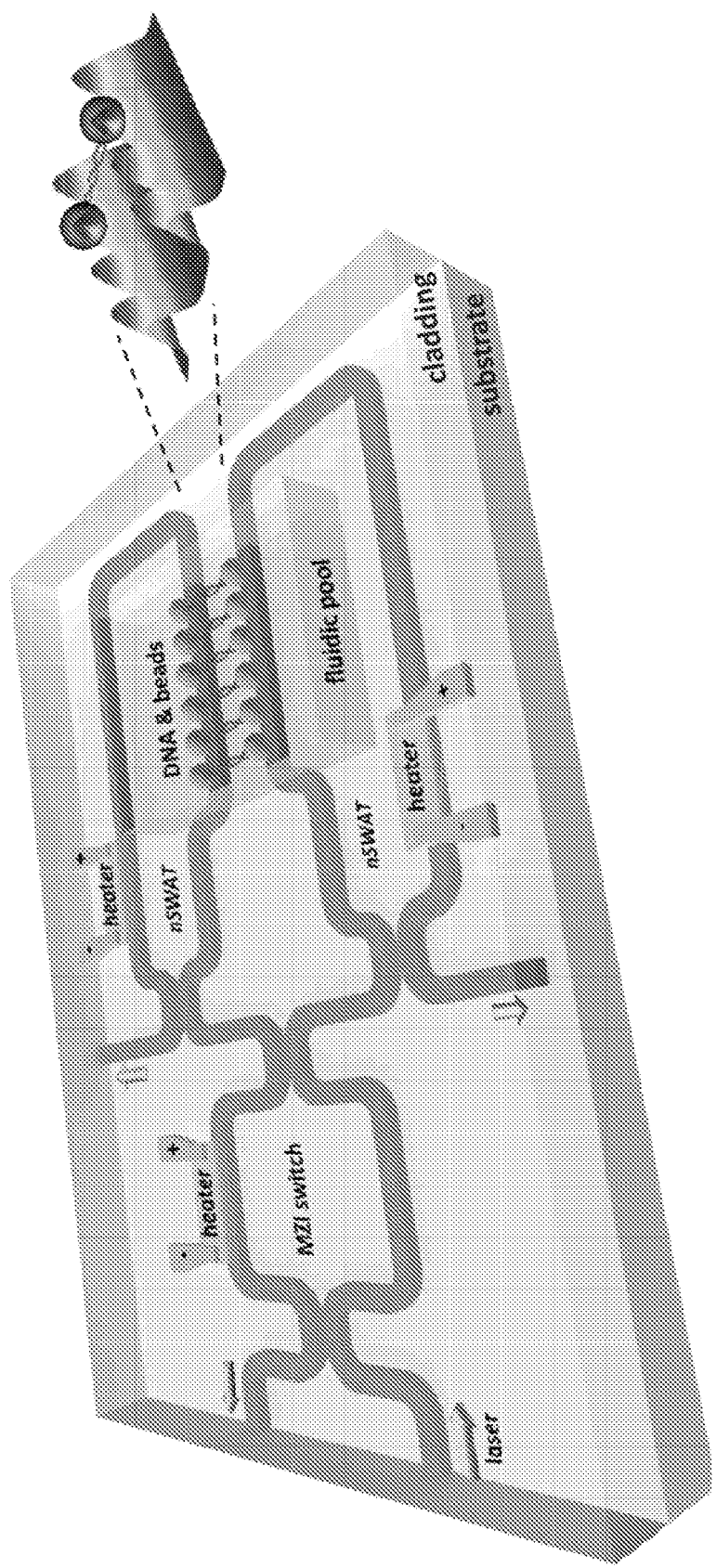

FIG. 9 shows yet another example of a microfluidic chip having optical waveguides with standing optical waves for trapping and moving particles in a fluid based on the basic design in FIG. 7, wherein the laser input to the waveguide is partitioned to two nSWATs using an MZI. nSWATs have a 50/50 waveguide beam splitter with connected output arms to create counter-propagating waves. There are three microheaters located above the waveguides: one in the MZI to control the partition of the laser into the two nSWATs, and two more to control the trap positions in each nSWAT. The microheaters and waveguides are buried in oxide, except for the exposed waveguides in the fluidic pool trapping region. The inset shows an array of traps with a DNA molecule suspended between two beads that are held by nSWATs. The colored 3-D plot shows the energy density of standing waves on both waveguides.

Figure 10:
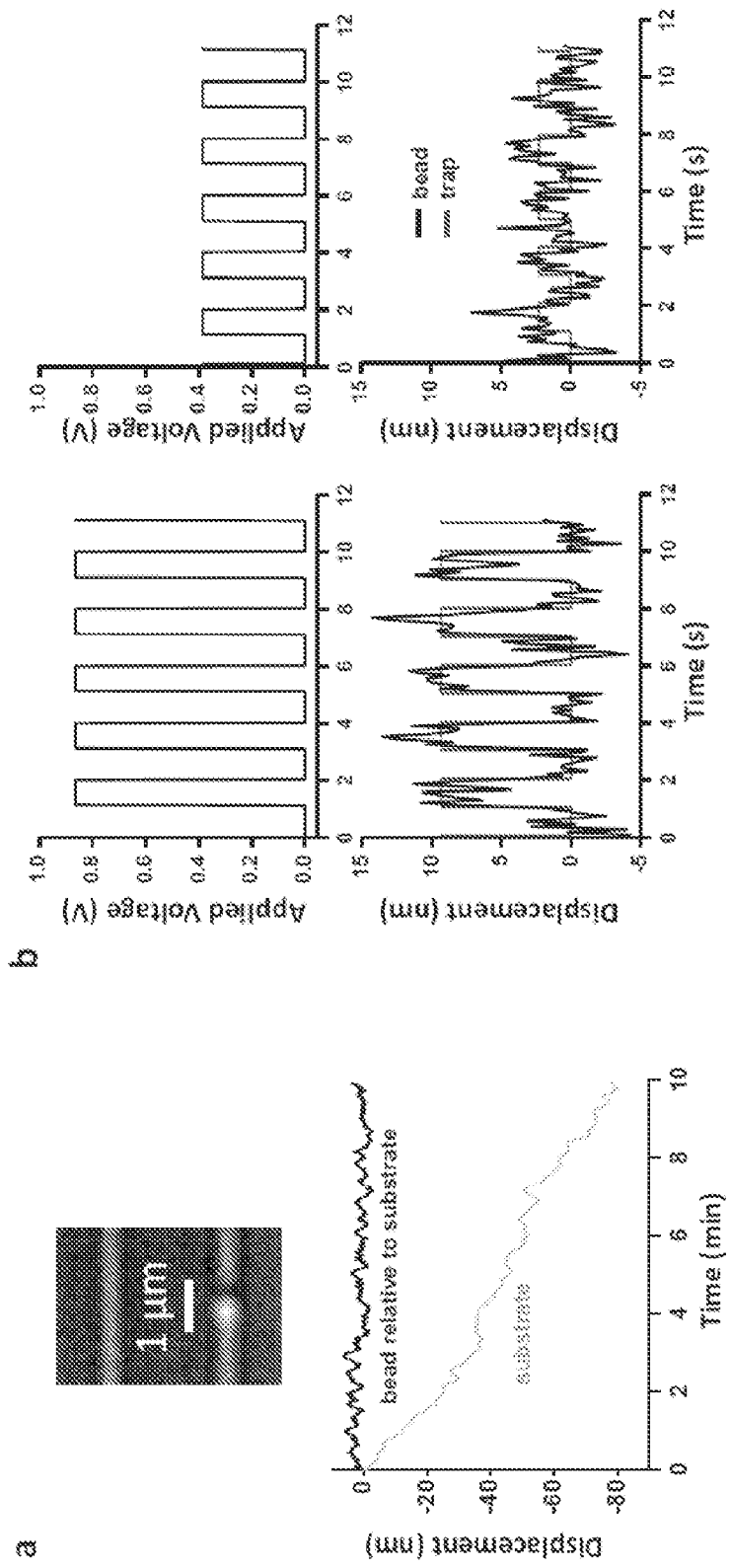

FIG. 10 shows trapping stability and resolution measurements. The top of FIG. 10(a) shows an optical microscope image of a bead (490 nm in diameter) held on the lower nSWAT. The bottom of FIG. 10(a) shows the bead position along the waveguide, relative to the waveguide, over 10 min. The oxide edge of the fluid region on the device was used as a fiducial marker. FIG. 10(b) shows the trapping control resolution. The position of a bead held by an nSWAT was measured as the trap was stepped in a square-wave fashion by the application of a voltage to the microheater to generate 9 nm (left) and 2 nm (right) steps. Red curves are fits with the amplitude, periodicity, and phase delay as fitting parameters.

11A, 11B and 12 show various measurements obtained in a sample device based on the implementation in FIG. 9.

Figure 13:
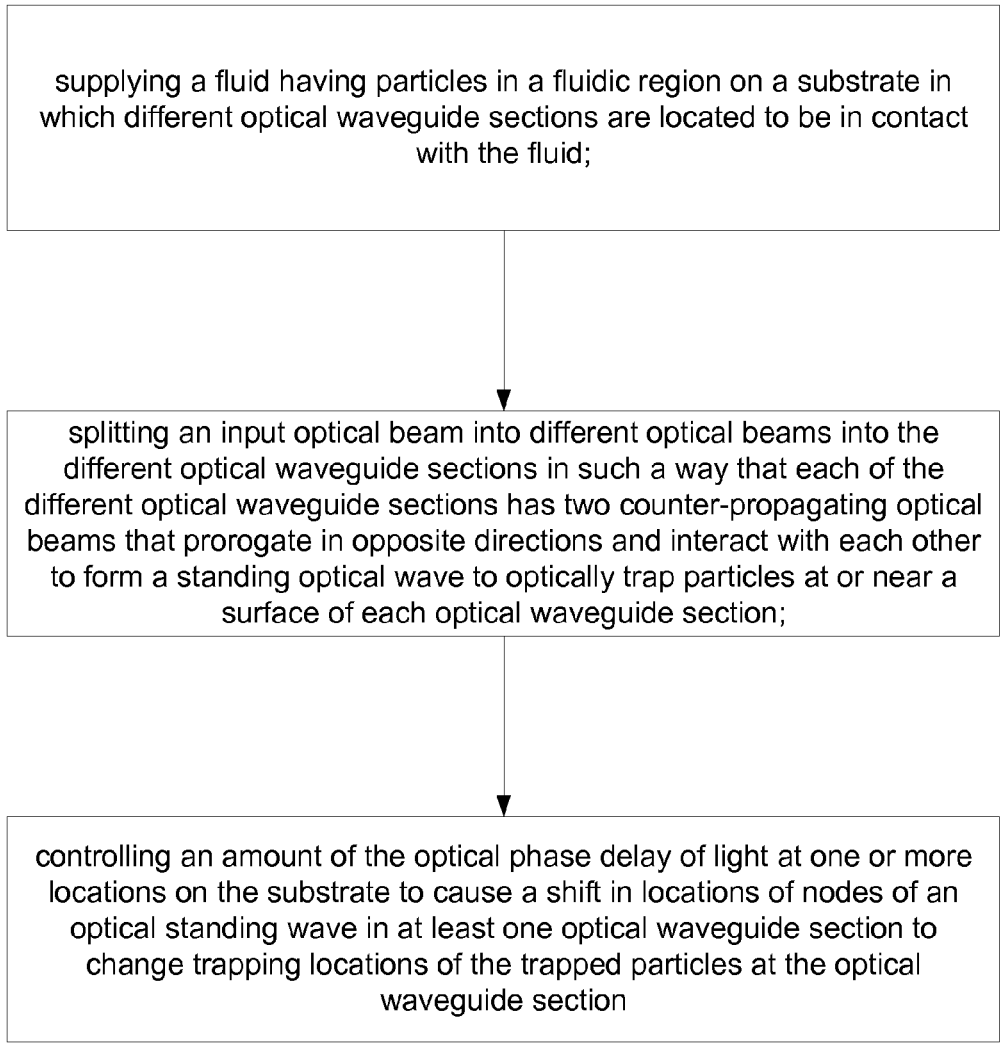

FIG. 13 shows a flow chart of an example of a method based on the disclosed technology.

DETAILED DESCRIPTION

The technology described here use a standing optical wave in an optical waveguide section to trap and move particles suspended in a liquid at or near the surface of the optical waveguide section. This disclosed technology can be implemented to construct a miniaturized electrically controlled high-throughput optical trap for controlling or manipulating biomolecules and micro/nanoparticles. Integration of photonics, fluidics and electronics on the same platform on a chip can be used to provide nanophotonic designs. Based on such designs, chip-scale high-throughput optical trapping devices can be constructed and have been demonstrated. The on-chip electronic control is used to position and move the locations of the optical traps. Microfluidic integration is used for the efficient delivery of biomolecules and nanoparticles in an aqueous to the optical trapping region.

Advancements in optical trapping techniques during the past three decades have revolutionized many areas of molecular biology and biochemistry by permitting mechanical studies of individual biological molecules. In some implementations, only one molecule can be examined at a given time and thus many tedious experiments must be performed sequentially in order to obtain statistically significant results. The low throughout of these implemenations can significantly limit their potential and scope. Recent advancement in miniaturizing optical trapping devices using nanophotonic functionalities and microfluidic components in a platform called integrated optofluidics can use the strong gradient of the optical energy of the nanophotonic components and thus provide large optical forces at low optical powers, making these devices promising for efficient manipulation of biomolecules.

The disclosed technology provides further advancement by using unique optical waveguide designs to provide active tunability of the optical trapping devices in moving locations where particles are trapped. On-chip electronic techniques can be used to achieve such tunability. The disclosed technology can be used in various applications including biological applications wherein the aqueous buffer cannot be changed and, in some implementations, can provide tuning mechanisms that are fast in operation, consume low power, and are physically compact by using integrated nanophotonic chip designs.

Sample devices based on the disclosed technology were fabricated and tested to demonstrate a platform for high-speed tuning (e.g., approximately 20 KHz) in integrated optofluidic devices that are sensitive to a phase change induced by the thermo-optic effect. In the tested sample devices, the phase information is sent via an optical waveguide to the optofluidic device. The phase tuning device can be realized by integrating an on-chip electric microheater, isolated from the fluidic channel, to transfer thermal energy locally and efficiently to the waveguide. Because most fluids are electrolytes, co-localization of electronics and photonics in fluid could result in the corrosion of the electronics and unwanted conduction of electric current through the fluid. This design alleviates the need for co-localization in an aqueous solution. It also eliminates heat transfer through the fluid and undesirable temperature changes in the fluid.

Integration of photonics, fluidics, and electronics can be beneficial to various applications. The disclosed technology can be implemented based on integration of photonics, fluidics, and electronics in novel architectures and provide novel techniques for electrical tuning of a nanophotonic based optical trapping device, and demonstrate high-throughput mechanical manipulation of trapped nanoparticles and biomolecules. The disclosed technology generates an on-chip standing-wave pattern of optical energy in nanophotonic waveguides a nanophotonic Standing-Wave Array Trap (n-SWAT) to optically trap and manipulate nanoparticles or biomolecules. On-chip electronic control is provided to control the optical trapping so that the standing-wave pattern can be relocated to cause transportation of the trapped nanoparticles on the chip.

In one implementation, a microfluidic device based on optical trapping of particles is disclosed to include a substrate structured to include a fluidic channel which can carry a fluid having particles; and an optical waveguide loop formed on the substrate to include one or more waveguide sections that reside within the fluidic channel, an input optical port for the optical waveguide to receive an input optical beam, and an optical power splitter coupled to the optical waveguide loop to split the received input optical beam into two counter-propagating optical beams that prorogate in the optical waveguide loop in opposite directions and interact with each other to form standing optical waves in at least the one or more waveguide sections that reside within the fluidic channel to optically trap particles at or near a surface of the one or more waveguide sections that reside within the fluidic channel. This device further includes an electrically controllable phase control device formed on the substrate and coupled to a location of the optical waveguide loop and operable to control an optical delay experienced by guided light at the coupled location, wherein the electrically controllable phase control device is configured to respond to an electrical control signal to adjust an amount of the optical delay at the coupled location to cause a shift in locations of nodes of each optical standing wave to change trapping locations of the trapped particles in the fluidic channel.

Such a high-throughput n-SWAT device can be a useful tool for research in single molecule biology as many current experiments in this field undergo a time-consuming and sequential procedure making the progress in this field slow. Notably, n-SWAT can open new avenues for broad and streamlined applications of optical trapping, sensing, characterizing, manipulating, sorting or interacting with various particles including molecules, molecule clusters and chemical or biological objects.

In some implementations, one or more of the following features can be utilized to achieve certain advantages or benefits:

1—The n-SWAT device can be miniaturized and can be made as a compact unit.
2—The device can be configured to achieve a high throughput trap meaning that it can trap many nanoparticles with specific periodic spacing determined by the nanophotonic device design.
3—The n-SWAT device can be designed to consume low optical power for the high throughput trapping of nanoparticles.
4—The stiffness of the optical trap is large.
5—The device fabrication can be achieved via various fabrication techniques and can be mass manufacturable, especially with low cost technologies such as CMOS. Hence, many devices can be made with one fabrication run.
6—The fabricated microheater is very power efficient and compact and high speed making the tuning of the device fast and power efficient.
7—Delivery of the nanoparticles and single molecules is in a very low volume microfluidic channel which makes the experiment efficient.
8—The high-speed on-off switching of the optical trap in this device offers a solution to minimize photo-bleaching in experiments that require concurrent trapping and fluorescence, by interlacing the trapping laser with a fluorescence excitation laser.
9—The device is very robust for optical trapping experiment as all the elements are integrated on a chip and are less vulnerable to environmental effects.
10—Due to the lower laser power used for optical trapping on this device, the biomolecule are less subject photo-damage.
11—In this device the trapping location and its positioning can be controlled with nanometers resolution.

An exemplary apparatus for realizing an on-chip optical trap for the purpose of high throughput manipulation of biomolecules and micro/nano particles can be constructed by using an elegant method of design based on nanophotonic devices. A standing-wave pattern of optical energy is formed in a waveguide inside a microfluidic channel. Knowing that a standing-wave pattern is formed when two frequency-coherent or optically coherent counter-propagating waves with equal amplitudes interfere, an on-chip nanophotonic device design is required to generate two optical waves with equal amplitude to propagate in contra directions in the waveguide. The periodic nature of the standing-wave energy will allow the optical trapping of molecules and particles on the anti-nodes of the standing-wave pattern. As a result, this apparatus (an n-SWAT) is a high throughput trapping device in a sense that it can trap many particles simultaneously. Another unique feature of this device is translocation and positioning of the optical traps which can consequently move the trapped particles. This can be realized by inducing a phase change in one of contra-propagating optical waves to move the standing-wave pattern. Using the thermo-optic effect and by integrating an electrically controlled optical phase or delay controller, e.g., an electric microheater, to control or modify the refractive index of the nanophotonic waveguide locally to achieve the required phase change in the optical wave. The microheater is one exemplary implementation of the electrically controlled optical phase or delay controller and other electrically controllable designs can be used. The electrically controlled optical phase or delay controller is located outside of the microfluidic channel while integrated on-chip with the nanophotonic waveguides. Hence, by applying a voltage to the electrically controlled optical phase or delay controller in a controlled manner, the standing-wave pattern of optical energy can be trans-located. As a result, high-throughput dynamic manipulation of molecules and particles trapped in the standing-wave energy can be achieved.

Figure 1:
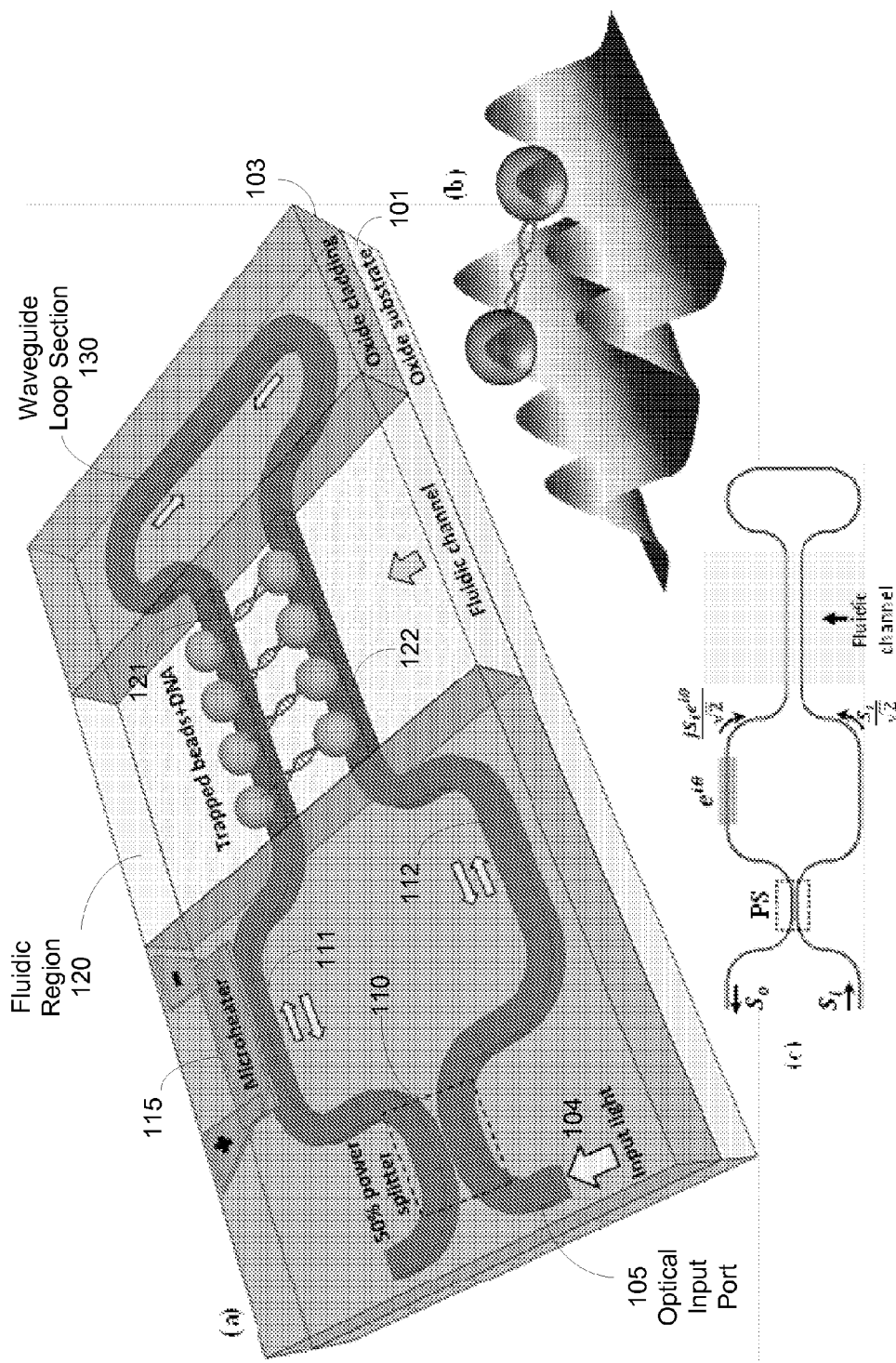
FIG. 1 shows one example of a microfluidic chip having optical waveguides with standing optical waves for trapping and moving particles in a fluid. The particles include molecules, molecule clusters and chemical or biological objects. In this device an input laser light (yellow) travels through a waveguide (red) and is split equally into two waveguide branches using a power splitter. The two waveguide branches are connected to each other to form a loop for the realization of the standing-wave pattern of light energy inside the waveguide loop. A microheater (green) is located above one of waveguide branches to induce the phase change in the light in the waveguide due to the thermo-optic effect resulting in the move and translocation of the standing-wave. Portion of the waveguide loop resides in a fluidic channel (sky blue) for trapping and manipulation of particles and molecules. Inside the fluidic channel, an array of dumbbell nanoparticles (brown) connected with DNA molecules (violet) are shown which are optically trapped on the top surface of the waveguides. Each nanoparticle is trapped on one anti-node of the standing-wave energy. (b) This figure shows the periodic pattern of the standing-wave energy in each waveguide branch in the fluidic channel with a dumbbell trapped on it. (c) A simplified two-dimensional schematic of the device presented in (a) with general design parameters indicated.

FIG. 1 shows an example of the proposed device using an integrated on-chip interferometer with part of it residing inside a microfluidic channel as part of the fluidic region on the chip. The device is built on a substrate platform having an substrate 101 and a cladding layer 103 formed over the substrate 101. Optical waveguides are formed in the cladding layer. The device includes an optical power splitter 110 at its input which divides the input light power of an input laser beam 104 equally into the two output arms in two optical waveguides 111 and 112 along two separate optical paths. In one of the output arms, the optical waveguide 111, includes a phase-shifter 115 made of a microheater for moving the interference fringes. The two optical waveguides 111 and 112 include optical waveguide sections 121 and 122, respectively, in a fluidic region 120 formed on the substrate where a fluidic channel is provided to supply a liquid in which particles such as molecules or bioparticles are suspended. The end of the two output arms 111 and 112 on the other sides of the optical waveguide sections 121 and 122 are connected to each other forming a loop section 130 so that the two contra propagating waves, one from each arm, interfere resulting in the formation of a periodic standing-wave pattern of light in this waveguide loop. As shown in FIG. 1(a) of FIG. 1 for the purpose of DNA manipulation, optical waveguide sections 121 and 122 as part of the arms of this waveguide loop can be fabricated in close proximity to each other in the fluidic channel to form a dual-trap as a high-throughput optical dual-trap. As illustrated, an array of dumbbells, two nanoparticles attached by a DNA strand, are trapped in the anti-nodes of the standing-wave energy provided by the optical waveguide sections 121 and 122.

FIG. 1(b) of FIG. 1 shows a typical distribution of the standing-wave energy in each waveguide arm with dumbbell DNA-nanoparticles trapped on it. These adjacent waveguides are optically isolated from each other and their spacing is comparable to the length of a single DNA molecule in the experiment. FIG. 1(c) of FIG. 1 shows the signals at various locations in the device in FIG. 1(a).

In implementations, the power splitter 110 at the input port 105 can be implemented in various configurations, including, for example, a multi-mode interference (MMI) design or a 3 dB directional coupler. In construction of a test device, a directional coupler was used due its simplicity of design and its reasonably large bandwidth for the wavelength range of interest. The laser for producing the input laser beam 104 can be an on-chip laser or an off-chip laser.

The principle operation of the device can be explained as follows with respect to FIG. 1(c). Assume an input light signal to the device with an amplitude S, which is normalized such that its squared magnitude represents its optical power. The directional coupler splits the input light into its two output arm with equal powers but with a 90 degree phase difference. The signal in one arm goes through a phase shifter and experiences a phase shift of θ. Because the two output arms of the coupler are looped back on one another, the two light signals will meet while propagating in contra direction which results in interference. For example, the interfered signal in the upper arm can be expressed as $$(jS_i e^{i\theta - i\beta z} + S_i e^{i\beta(L-z)})/\sqrt{2}, \quad (1)$$

where β is the propagation constant of the wave inside the waveguide, z and L-z are the travelled distances of the waves in the upper arm and the lower arm to reach the meeting point, respectively, where L is the length of the waveguide loop. By simplifying the Eq. (1) we can obtain the following expression for the interference signal $$\sqrt{2} S_i e^{i\theta/2 + i\pi/4 + i\beta L/2} \cos(\beta z - \theta/2 + \beta L/2 - \pi/4). \quad (2)$$

From the above expression we can see the periodic behavior of interference as a function of distance z. The intensity of the interference signal is $$I = 2|S_i|^2 \cos^2(\beta z - \theta/2 + \beta L/2 - \pi/4), \quad (3)$$

which represents the periodic standing-wave pattern of the light energy with a period of π/β. From Eq. (3) we can obtain the following results: 1—the period of the standing-wave depends on which by itself depends on the waveguide dimension and its material properties; 2—the standing-wave fringes can be moved by changing θ through the phase-shifter; and 3—the contrast between the nodes and anti-nodes of the standing-wave is controlled by the input light intensity. It is to be noted that this contrast can be controlled by the directional coupler if the split powers in each arms are not equal. In this case while the nodes do not go to zero intensity, there will be a traveling-wave inside the loop which is equal to the power difference between each arm of the directional coupler.

Therefore, FIG. 1 shows a nanophotonic standing-wave array trap (n-SWAT) device for high-throughput manipulation of biomolecules and micro/nano particles with integration of photonics, fluidics, and electronics to realize the n-SWAT.

Figure 2:
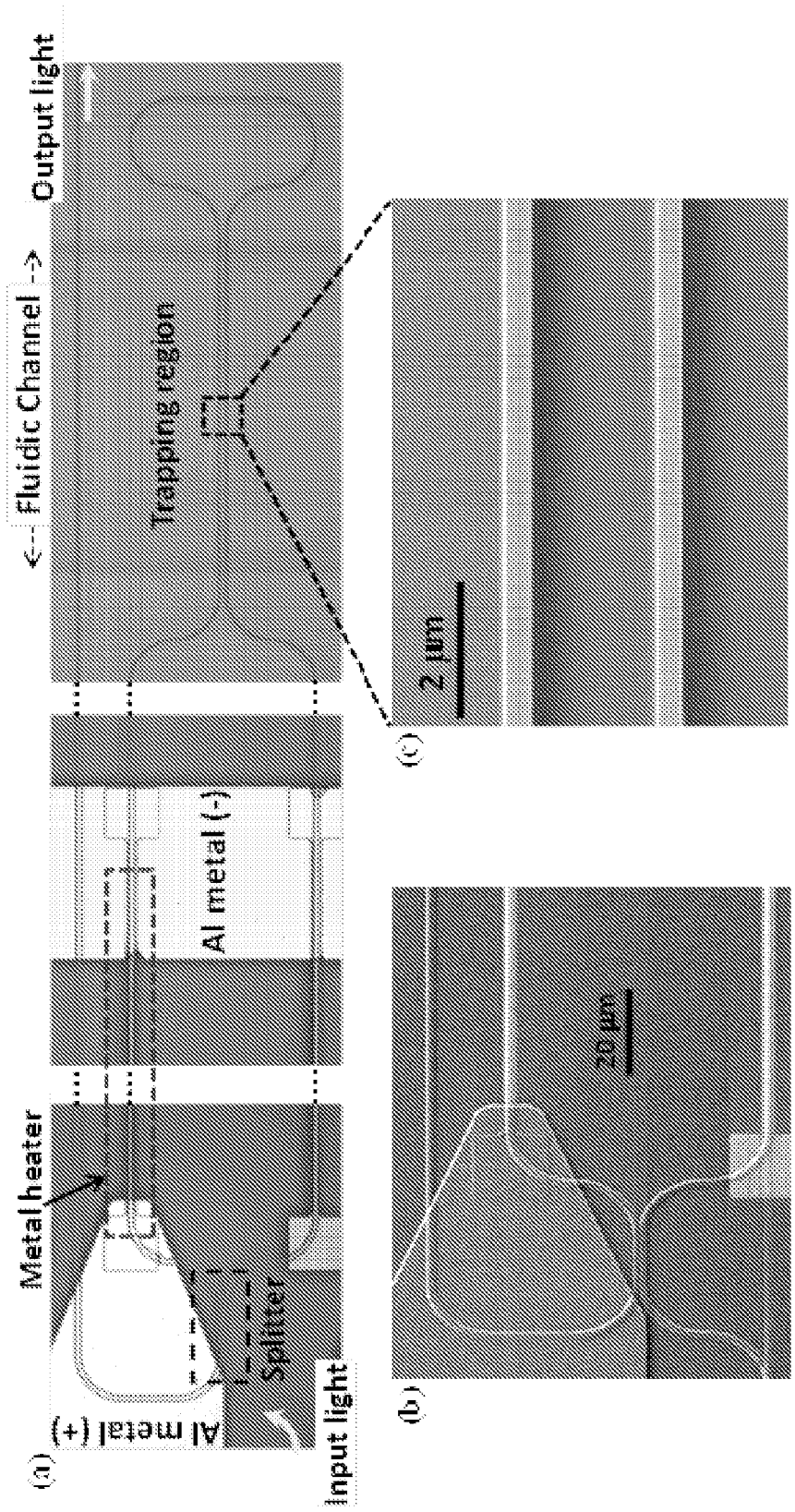
FIG. 2 shows one example of an implementation of the microfluidic chip in FIG. 1 (n-SWAT). (a) Optical microscope view of the fabricated nanophotonic tweezer. The waveguides are made of silicon with a thickness of 250 nm and width of 440 nm. (b) A zoomed SEM view of the splitter region with the heater and contact electrode on the upper am. The splitter has a straight coupling length of 14.5 µm and the gap between the two waveguides is 450 nm. The straight waveguides of the splitter are separated at the end by curved waveguides with a radius of 12 µm. The heater is made of Ni with a thickness of 200 nm and a width of 2.5 µm and a length of 1.5 mm To balance the optical loss of the two arms, a metal heater without any electric connection is also on the lower arm. (c) A zoomed SEM view of the waveguides in the trapping region. The spacing between these two waveguides in the trapping region is 1.8 µm.

FIG. 2 shows an implementation of the design in FIG. 1(a) in a silicon-on-insulator (SOI) platform, as Si has both a large thermo-optic coefficient ($1.86 \times 10^{-4}$ K$^{-1}$) and a large refractive index (3.475). This sample device was designed to operate at a wavelength near 1550 nm because many commercially available tunable lasers and optical equipment work in this range. The temperature increase due to the microheater is localized within a few microns of the microheater. Therefore, essentially no temperature increase at the optical trapping region occurs due to the microheater.

In the design and experiments presented here, we used the transverse magnetic (TM) polarization (electric field predominantly normal to the wafer plane) for the waveguides. This polarization has a stronger field along the top surface of the resonator as compared with that along the side surfaces. This makes TM polarization more suitable for optical trapping applications, as opposed to the alternative transverse electric (TE) polarization (electric field predominantly in the wafer plane).

FIG. 2 includes microscope images of a fabricated device in FIGS. 2(a), 2(b) and 2(c). The fabrication process of the device began with patterning the waveguides using electron-beam lithography. The resist maN 2403 was used as a mask followed by plasma etching. In the next step, the region which will ultimately become the fluidic trench was protected by initially masking with a thin layer (~50 nm) of sputtered chromium (Cr). For this step, the entire device were first sputtered by Cr, and then using optical lithography and wet etching using Cr etchant, the Cr from the entire device except the fluidic region was removed. In the next step, the waveguides were clad with a 1 μm plasma-enhanced chemical vapor deposition (PECVD) oxide. The process was continued with two subsequent steps of lithography, metal evaporation, and lift-off to define the metal heater (Ni) and the contact electrodes (Al). The Ni heater was 2.5 μm wide and 200 nm thick (10 nm of titanium was evaporated a priori as an adhesion layer between the Ni and the oxide). The Al electrodes had a thickness of 700 nm. The metal heater and electrodes were covered by another 1.5 μm of oxide to isolate them from the fluid. Hence, the overall oxide thickness above the waveguide was 2.5 μm. In the next step, optical lithography and plasma etching removed the oxide cladding from the fluidic region and the etching stopped at the Cr interface. Then, using a Cr wet etchant, the thin Cr layer was removed from the fluidic region to expose the silicon waveguides in this region. A subsequent step of optical lithography and plasma etching removed the oxide from a portion of the Al contact electrodes and exposed them to the off-chip metal probes. The next step was to integrate the chip with a microfluidic channel. In conventional microfluidic fabrication, PDMS is used as the channel seal and is bonded to the top surface of the fabricated chip. However, PDMS distorts the image when the fluidic device is imaged through a microscope. Therefore, in this work, a glass film (170 μm thickness) was bonded to the chip to form the fluidic channel seal. For simplicity of fabrication, the glass was bonded to the device surface using Parafilm and the fluidic channel boundaries were defined by a Parafilm layer, both from the sides as well as by the chip and glass surfaces from bottom and top, respectively. In a more advanced construction, the glass can be bonded to the device top surface using wafer bonding techniques in microfabrication technology. The flow inlet and outlet holes can be perforated into the glass or the device substrate. For this device, we etched the holes through the device substrate (silicon) and fluid was flowed in and out from the back of the substrate.

The described technology can be implemented to achieve a high precision and full dynamic control of a high throughput n-SWAT using the integrated microheater. For the experimental characterization of the device, tunable laser light (at 1550 nm) was coupled to the chip using an optical tapered lensed fiber. A polarization controller adjusted the light polarization for maximum coupling of light from the fiber to the TM polarization mode of the waveguide. The transmitted light through the chip was collected from the opposite end of the chip using an additional tapered lensed optical fiber and ultimately sent to a photodetector. A microprobe, for applying electric voltage, was connected to the contact electrodes of the microheater. By sweeping the laser wavelength and monitoring the transmitted power through the chip using the photodetector, the spectrum of the device was characterized. The optimal operation range is where the minimum light is transmitted to the output port of the device. This means that a standing-wave made of counter-propagating waves with nearly equal amplitudes has been formed in the trapping region. For this device, the measured resistance of the microheater was ~300 Ω.

In the optical experiment, aqueous solution containing polystyrene nanoparticles with diameters of 490 nm and 790 nm was flowed, using a syringe pump, into the fluidic channel through inlet/outlet holes located at both ends of the channel. Once the nanoparticles were near the optical trapping region, they were trapped by the waveguide. At this point, by applying a voltage to the microheater and shifting the standing-waves, we were able to relocate the trapped particles.

Figure 3:
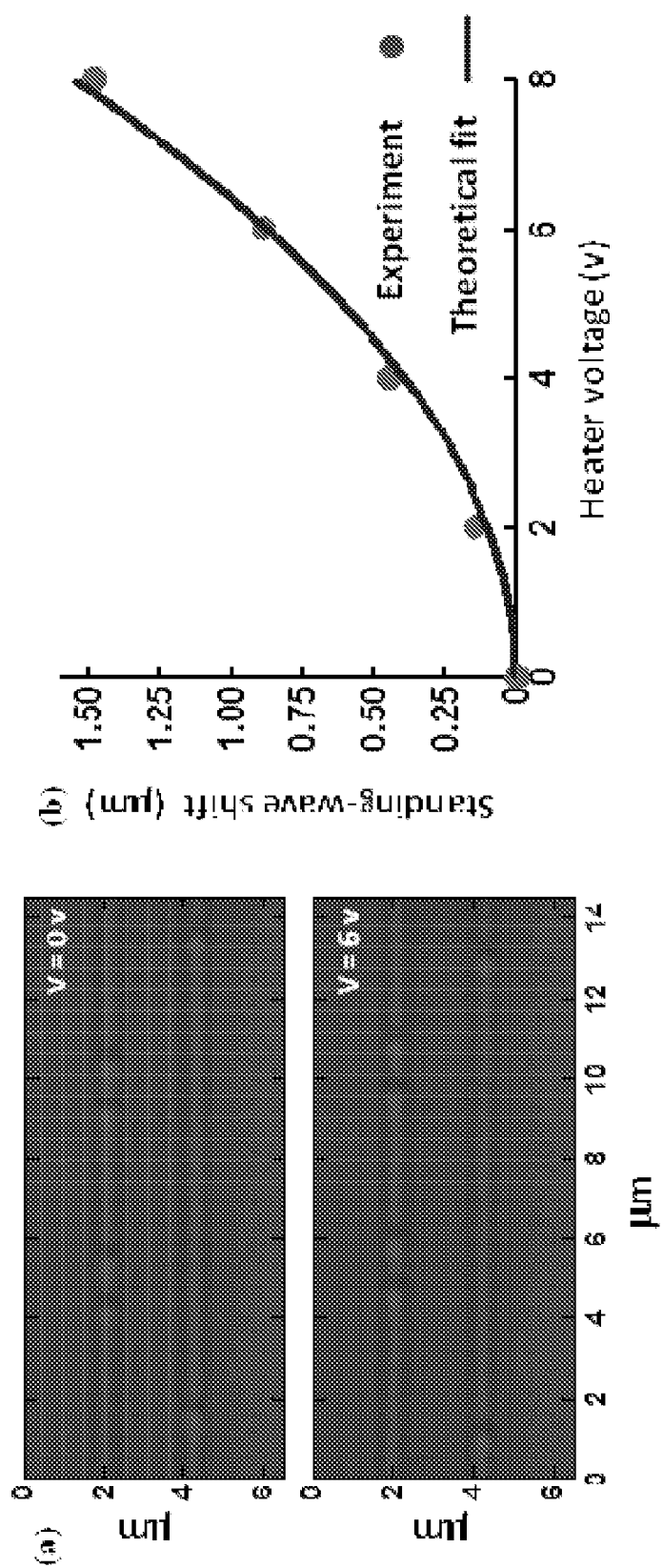
FIG. 3 shows various measurements obtained in a sample device based on the implementation in FIG. 2. (a) Trapping of polystyrene nanoparticles with 490 nm diameter on the waveguides at two different voltages applied to the heater as indicated. As seen from this figure, by applying the voltage, the particles on the upper arm move to the right and the particles on the lower arm move to the left. These moves are the result of the shift in the standing-wave position. (b) Shift of the optical standing-wave by applying a voltage to the microheater. This was measured by monitoring the translocation of the trapped nanoparticles in the standing-wave optical trap while applying a voltage to the heater.

FIG. 3 shows measurements obtained from the sample device in FIG. 2. FIG. 3(a) shows the position of the trapped particles on the two arms of the n-SWAT for two voltages of 0 V and 6 V. As seen from this figure, a clear shift of nanoparticles due the shift of the standing-wave caused by the heater is observed. FIG. 3(b) shows the experimental results on the shift of the standing-wave for different voltages applied to the heater. As seen from this figure, the fitting of the experimental data to theory shows a quadratic variation of the standing-wave shift versus the applied voltage to the heater. This is expected as the heat power generated by the heater is proportional to the square of the voltage. The heat power is linearly proportional to the temperature which by itself is linearly proportional to the refractive index change. As a result, the standing-wave shift, which is linearly proportional to the refractive index change, quadratically changes with the voltage applied to the heater.

FIG. 3(b) suggests that, for large range moving of the trapped nanoparticles in n-SWAT a larger voltage is required. This can result in larger power consumption and heat dissipation which can ultimately damage the microheater. To overcome this problem, we invented a novel approach for the large range transportation of the nanoparticles in an n-SWAT while keeping the voltage and consumed power at a low level. For this purpose, we first find the voltage required to move the standing-wave by a distance of one period. After finding this we make a sawtooth voltage pattern with a peak voltage equal to the aforementioned voltage and apply it to the heater. A sawtooth voltage has a smooth rise time and an abrupt fall time. During the rise time of the voltage, the trapped nanoparticles can follow the shift of the standing-wave. However, at the fall time of the sawtooth which is abrupt, the nanoparticles cannot respond. In contrast, the standing-wave responds quickly and shifts back one period. In fact this response time is determined by the speed of the microheater which is ~20 KHz for our device and much faster than the dynamic response time of nanoparticle in the fluid. Because, of the abrupt backshift of standing-wave, which is one period distance, the nanoparticle falls into the trapping potential of the adjacent anti-node and effectively does not move. However, by the beginning of the next cycle of the sawtooth which starts smoothly the nanoparticle responds and moves forward again. As a result, a smoothly continuous transportation of the nanoparticles by using this approach can be achieved.

Figure 4:
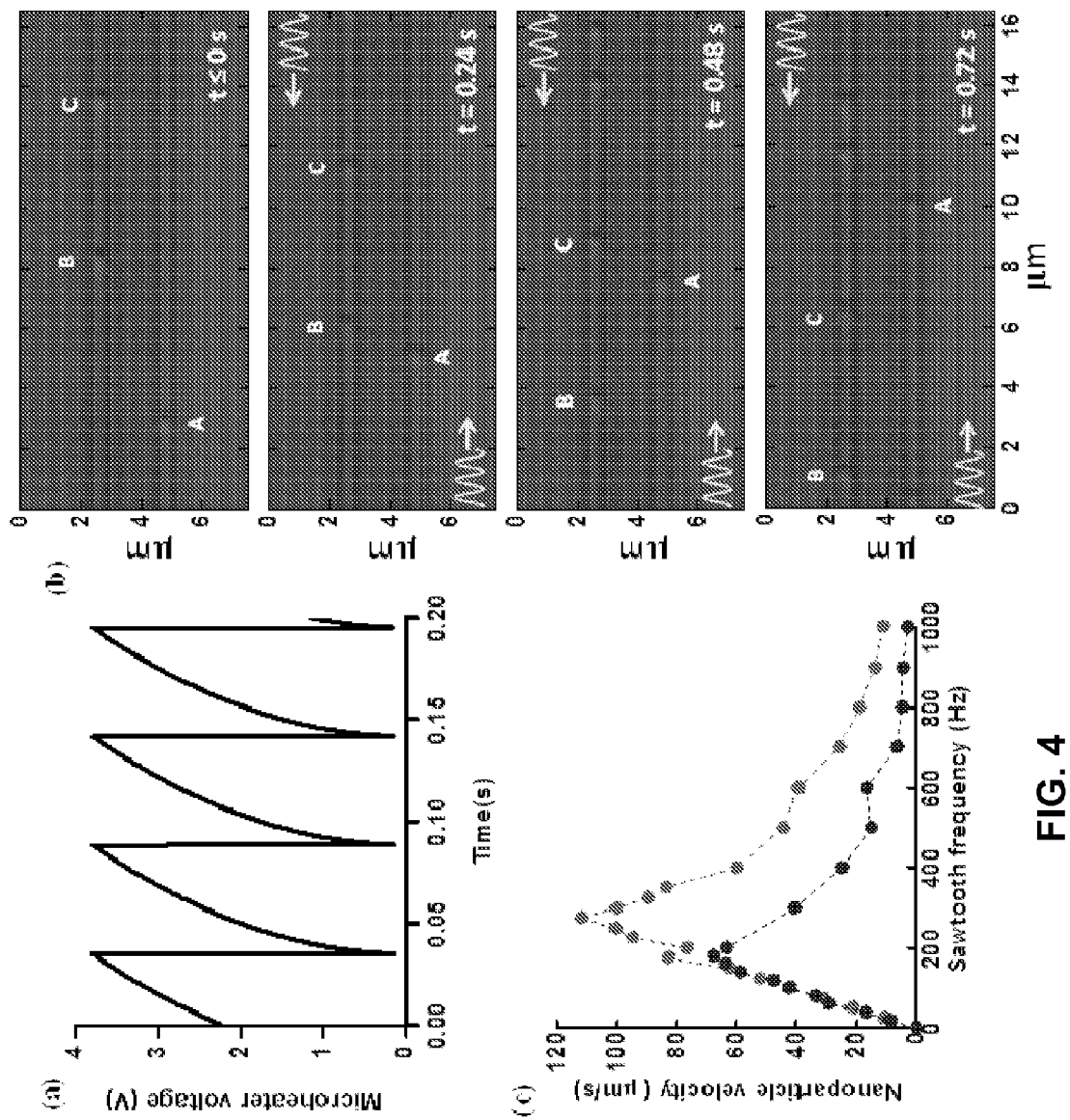
FIG. 4 shows measurements for long range transportation of nanoparticles using the n-SWAT in FIG. 2. (a) a periodic nonlinear sawtooth voltage is applied to the heater to move the nanoparticles continuously in one direction. The square value of this sawtooth voltage is a linear sawtooth, which is linearly proportional to heater power and temperature rise, making the shift of the nanoparticles with steady velocity. The peak amplitude of the sawtooth is such that the standing-wave and correspondingly the trapped nanoparticles shift one period of standing-wave during the one period of the sawtooth. The speed of the nanoparticles is controlled by the frequency of the sawtooth. (b) Captured video frames of nanoparticles (490 nm in diameter) trapped on the two arms of the n-SWAT and their travel response when the sawtooth voltage with a frequency of 25 Hz is applied to the heater. Initially and before applying the voltage (at time t≤0), the standing-wave and correspondingly the trapped particles are static. The yellow arrows and the periodic yellow symbol next to them show the direction of the move the standing-wave in each arm. For clarification, three nanoparticles has been labeled as A, B, and C, respectively, and their positions have been monitored. (c) Variation of the velocity of the nanoparticles versus the sawtooth frequency for two different laser powers. The velocity of the nanoparticles increases linearly with increasing the sawtooth frequency up to a frequency that the particles are not able to respond and their velocity reduces exponentially.

Referring to FIG. 4, FIG. 4(a) shows a typical sawtooth pattern of the voltage which has a nonlinear behavior as opposed to a conventional linear sawtooth function. The rationale behind having such nonlinear sawtooth function is to obtain a constant velocity for the nanoparticle the velocity of the standing-wave shift as explained below. The shift in the standing-wave is linearly proportional to the change in the refractive index of the waveguide which by itself is linearly proportional to the temperature change. The temperature change is also linearly proportional to the heat power. As result, to have a long-range shift in the standing-wave with constant velocity, the heat power should be a linear sawtooth function. Knowing that the heat is proportional to square of the voltage, then, the voltage varies nonlinearly as a squared root of a linear sawtooth function.

FIG. 4(b) shows the experimental results for large range transportation of nanoparticles when a sawtooth with a 25 Hz frequency is applied to the heater. In the absence of the sawtooth voltage to the heater, the nanoparticles are steadily trapped on the waveguide. When the sawtooth voltage is applied to the heater the trapped nanoparticles move uniformly in the direction of the shift of the standing-wave.

Notably, the increasing of the frequency of the sawtooth voltage can cause the velocity of the nanoparticle to increase. As particle response is limited by the fluid viscosity, we expect that at higher frequencies the particles will not respond and move faster. This has been experimentally measured and shown in FIG. 4(c) where at low frequencies the velocity of the particle linearly increases by increasing the frequency and at some transition point, the velocity of the particles decreases exponentially at higher frequency. However, as we increase the laser power to make the optical trap stiffer, the nanoparticles frequency response increases as shown by the results in FIG. 4(c) for two different laser power. From this figure we see that by increasing the laser power, the transitioning of the velocity from a linearly increasing to an exponentially decreasing behavior occurs at larger frequencies.

Figure 5:
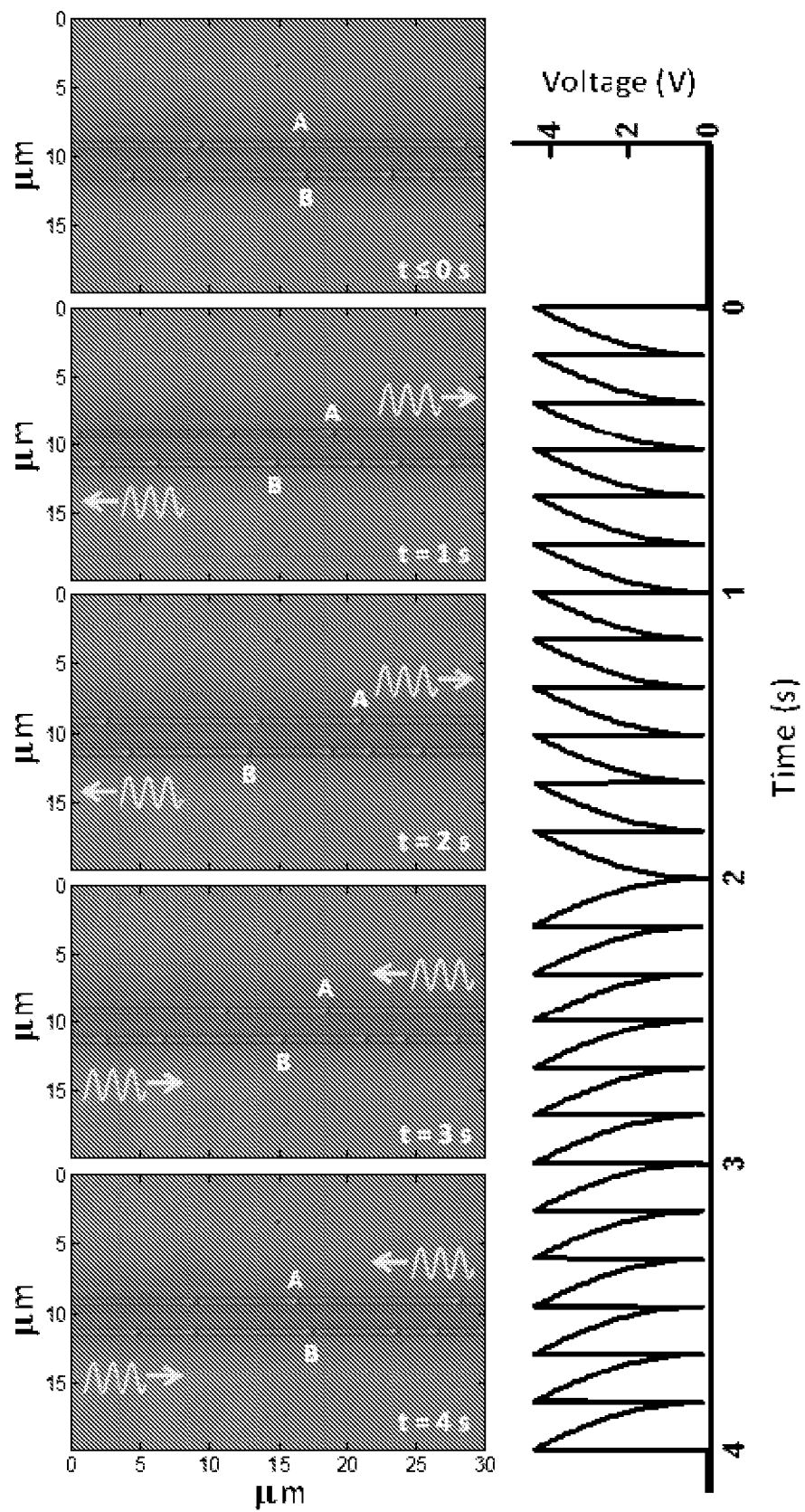
FIG. 5 shows measurements for long range back and forth transportation of nanoparticles using the n-SWAT in FIG. 2. The left panels show the captured video frames of nanoparticles on the two arms of the n-SWAT and their travel response when a sawtooth voltage is applied to the heater. The yellow arrows and the yellow periodic symbol next to them show the direction of the move of the standing-wave in each arm. For clarification, two nanoparticles have been labeled as A and B, and their positions have been monitored. During the time period of 0≤t≤2 s, the particles on the upper (lower) arm of the n-SWAT move to the right (left), while during the time period of 2<t≤4 s that the sawtooth voltage changes, the particles on each arm flip the moving direction. The panel on the right shows the variation of the sawtooth voltage versus time.

It is also possible to have a control on the direction of the transportation of the nanoparticles and move it backward or forward. This can be done by controlling the sawtooth voltage. Typically, a sawtooth function starts with a smooth rise time and sharp fall time. However, if we arrange it so that it starts with a sharp rise time and smooth fall time, then the standing-wave will shift in the opposite direction. To verify this, we did an optical trapping experiment in which by controlling the sawtooth voltage we could move the nanoparticles forward and backward for a large distance. The results have been shown in FIG. 5. As seen from this figure, for the first two seconds when the sawtooth voltage is applied the nanoparticles move in one direction, and when the fall time and rise time of the sawtooth is reversed, the direction of the transportation of the nanoparticles change. This is very promising for application where a bio molecule can be transported to another portion of this lab-on-chip device where a chemical reaction is done, and then returned back to its original point or the point of interest.

Another distinctive feature of the n-SWAT device is the manipulation and stretching of DNA molecules. As shown in FIG. 1(a) and discussed earlier, DNA-dumbbell constructs can be trapped on the two arms of the n-SWAT and by moving the nanoparticles of the dumbbell in opposite directions through shifting the standing-wave, the DNA can be manipulated and stretched. To verify this concept we performed an experiment wherein DNA-dumbbell constructs were flowed into the chamber to be trapped by the n-SWAT. To simplify the detection and visualization of the dumbbell, it was made of two different nanoparticles in size with diameters of 490 nm and 790 nm. The length of the DNA for this experiment was 10 kilobase pairs (kb), or approximately 3.4 µm fully extended.

Figure 6:
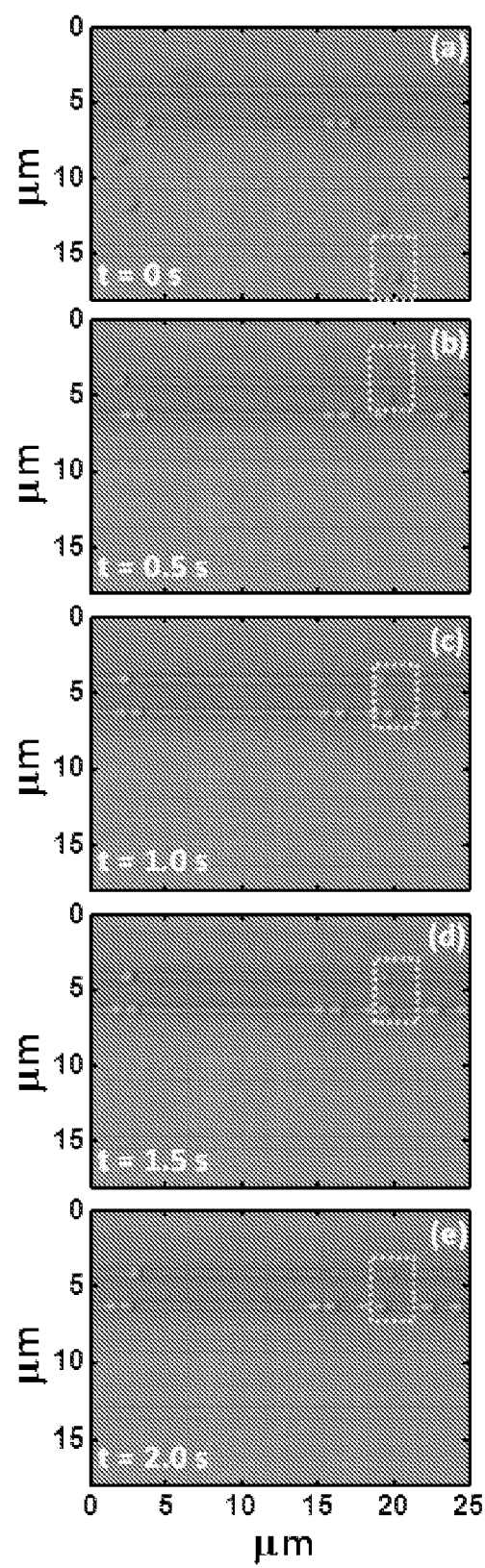
FIG. 6 shows measurements for manipulation and stretching of DNA molecules using the n-SWAT in FIG. 2. The figure panels show the captured video frames of a DNA-dumbbell construct that approaches the n-SWAT and trapped on it. For clarification, the DNA-dumbbell has been highlighted with a dashed yellow square in each frame. The dumbbell has been made of two different nanoparticles in size with diameters of 490 nm and 790 nm and with a DNA length of 10 kb. Using the fluid flow, the dumbbell approaches the trapping region ((a) and (b)). Once trapped by the n-SWAT (c), each nanoparticle of this dumbbell is on one arm of the n-SWAT. A periodic voltage has been applied to the heater to move the standing-wave back and forth resulting in the periodic moving of the beads and stretching the DNA ((c), (d), (e)). In the shown frames, there are other single nanoparticles with 790 nm diameter trapped on the n-SWAT and move periodically.

FIG. 6 shows the result of the experiment. The panels shown in this figure are the captured video frames at sequential times when a DNA-dumbbell approaches the n-SWAT and gets trapped. During the experiment, a periodic voltage was applied to the heater to move the standing-wave back and forth periodically. Once the DNA-dumbbell was trapped on the waveguide, the nanoparticles of the dumbbell moved periodically in contra directions according to the shift of the standing-wave. This resulted in stretching of the DNA in a periodic manner. From this experiment, and knowing the high throughput nature of the n-SWAT, we conclude that we can trap a higher number of DNA-dumbbells and manipulate them. This requires a higher concentration of DNA-dumbbell constructs in the fluidic channel in the vicinity of the n-SWAT. Therefore, by using the n-SWAT and optimizing the DNA-dumbbell concentration, performing high-throughput single molecule experiments is realizable.

In the n-SWAT shown in FIG. 1 the two trapping arms 121 and 122 are not independent of each other. As discussed earlier, the trapping arms are either both on or both off. In addition, the phases of the standing-wave in both arms are not independently controlled. While this device by itself has promising applications for the trapping and manipulations of nanoparticles and biomolecules, its architecture can be further advanced to a newer generation of design so that the trapping and the phase of the standing-wave in each trapping arm is controlled independently. Such new design for the n-SWAT adds more degree of freedom for optical trapping and manipulation. In this section, we introduce our design for this type of n-SWAT.

FIG. 7 shows another design based on the disclosed technology. Under this design, a microfluidic device based on optical trapping of particles is provided to include a substrate structured to include a fluidic region which can contain a fluid having particles and optical waveguides formed on the substrate to include (1) a first Mach-Zehnder interferometer that is located outside the fluidic region and receives an input laser beam and splits the received input laser beam into two laser beams along two different optical paths of the first Mach-Zehnder interferometer to produce a first optical beam; and (2) second Mach-Zehnder interferometers that are located inside the fluidic region and each receive a respective portion of light of the first optical beam output by the first Mach-Zehnder interferometer. Each second Mach-Zehnder Interferometer splits received light into two optical paths that are connected so that each optical path receives counter-propagating optical beams in opposite directions that interact with each other to form standing optical waves to optically trap particles. This device further includes a first electrically controllable phase control device formed on the substrate and coupled to a location of the first Mach-Zehnder interferometer and operable to control an optical delay between the two optical paths of the first Mach-Zehnder interferometer; and second electrically controllable phase control devices formed on the substrate and coupled to the second Mach-Zehnder interferometers, respectively, each second electrically controllable phase control device operable to control an optical delay between the two optical paths of a respective second Mach-Zehnder interferometer FIG. 7(a) shows the design and FIGS. 7(b) and 7(c) show the images of a test device that was fabricated and tested. In this device, the input optical power ($P_{in}$) is sent to a Mach-Zehnder (MZ) interferometer with a phase-shifter ($\phi_1$) in one of its arms. The power distributions in the two output arms of the MZ varies by the phase of $\phi_1$ as $P_A = P_{in} \cos^2(\phi_1/2)$ and $P_B = P_{in} \sin^2(\phi_1/2)$. Therefore, by varying $\phi_1$ from 0 to $\pi$, $P_A$ ($P_B$) can go from its maximum (minimum) value which is $P_{in}$ (0) to its minimum (maximum) value which is 0 ($P_{in}$). As a result the optical power can be switched between $P_A$ and $P_B$. In the next stage, the optical powers $P_A$ and $P_B$ are sent to two 3 dB power splitters PS3 and PS4 respectively. The outputs ports of these splitters with equal powers $PA_1$ ($PB_1$) and $PA_2$ ($PB_2$) are connected to form a standing-wave pattern of energy in their corresponding waveguide loops. These stages and their operation principles are similar to the one shown in FIG. 1(c) and discussed earlier. In these stages there are phase-shifters $\phi_2$ and $\phi_3$, respectively, to move the standing-wave energy in each waveguide loop independently. The waveguide arms of these two stages are brought near each other to form two independent trapping arms in the trapping zone as marked in FIG. 7(c). When $P_A = P_{in}$ ($P_B = P_{in}$) and $P_B = 0$ ($P_A = 0$), the upper (lower) trapping arm is ON with the maximum laser power $P_{in}$ and the lower (upper) trapping arm is OFF. However, by adjusting the phase of $\phi_1$, these two optical traps can have equal or unequal trapping energies ranging from 0 to a maximum which is defined by $P_{in}$. In an ideal situation where all the power splitters PS1-PS4 split the power equally, the optical signals at the output ports designated with $P_{out1}$-$P_{out3}$ should be zero. The waveguides of this trapping zone reside in a fluidic region for the interaction with nanoparticles and biomolecules. The phase-shifters $\phi_1$, $\phi_2$, and $\phi_3$ can be realized by electric microheaters.

FIG. 7(b) shows an optical microscope view of the fabricated device described in FIG. 7(a). As shown in this figure, the microheater phase-shifters have been highlighted by yellow dashed boxes. These heaters have been connected from one end to the signal Al contacts designated with $S_1$-$S_3$, and from the other end to the ground (GND) Al contact. FIG. 7(c) shows an electron microscope view of the waveguides in the trapping region.

FIG. 8 shows measurements of the trapping and manipulation of nanoparticles with the n-SWAT device shown in FIG. 7. At first, the phase-shifter $\phi_1$ was adjusted so that only the lower trapping arm was ON. Therefore, polystyrene nanoparticles with 356 nm diameter were flown into the fluidic channel and were trapped by the standing-wave energy of the lower trapping arm (FIG. 8(a)). At this stage a saw-tooth pattern of voltage was applied to the phase-shifter $\phi_3$ to movement of the standing-wave, and correspondingly the trapped nanoparticles, forward and backward along the waveguide as shown in FIG. 8(b) and FIG. 8(c). The yellow arrows in these figures show the direction of the move of the standing-wave. As seen clearly from these figures, the trapped particles have been relocated. In the next stage, the saw-tooth voltage to the $\phi_3$ was stopped and $\phi_1$ was readjusted so that the lower trapping arm was turned OFF and the upper trapping arm was turned ON. Therefore, the nanoparticles initially trapped by the lower arm were freed and attracted by the upper trapping arm and became trapped (FIG. 8(d)). At this stage a saw-tooth pattern of voltage was applied to the phase-shifter $\phi_2$ to move the standing-wave, and correspondingly the trapped nanoparticles, forward and backward along the waveguide as shown in FIG. 8(e) and FIG. 8(f). This experiment clearly showed that the power of each trapping arm could be controlled by the first phase-shifter $\phi_1$, and the shifting of the standing-wave in each arm could be independently controlled by phase-shifters $\phi_2$ and $\phi_3$.

The n-SWAT demonstrated in this section can significantly simplify the trapping of an array DNA-dumbbell constructs in the trapping region. The independent and dynamic control of the two traps, and live monitoring of the nanoparticles and DNA molecules in this compact device the realization of high throughput single molecule experiment in an efficient manner is realizable.

The above examples use the thermo-optic effect to provide the electrically controlled phase in the optical waveguide. Various other physical effects, such as the electro-optic effect in silicon, may also be used to induce a phase change in the waveguides by changing, e.g., the refractive index Implementation of an electro-optic phase controller may be realized by integration of a P-i-N diode with the waveguide to induce the refractive index shift. The refractive index change due to the electro-optic effect in silicon is weaker than the thermo-optic effect. However, the response time of the electro-optic effect in silicon is much faster than that of the thermo-optic effect. Since most dynamic phenomena are slow in fluids, a thermo-optic based device would be suitable for most applications. While waveguides may be fabricated from a variety of optical materials that have thermo-optic effects, we focused on materials which were compatible with mass manufacturing micro- and nano-fabrication technologies, such as complementary-metal-oxide-semiconductor (CMOS) technology. For this purpose, silicon (Si), silicon nitride ($Si_3N_4$), and silicon dioxide ($SiO_2$) are widely used in CMOS technology and were natural candidates. Si is optically transparent in the wavelength range of 1200 nm and above; $Si_3N_4$ is transparent in a much broader wavelength range spanning the entire visible range to infrared (IR) and mid IR; SiO2 can be used as the cladding layer as it has a lower refractive index than those of Si and $Si_3N_4$. Another alternative choice of material for the realization of the waveguide is to use polymer materials such as SU-8 which are bio compatible and have good optical properties.

Laser light of an appropriate wavelength can be a nondestructive tool in biophysical studies, drug delivery, and pharmaceutical applications. The devices proposed here is laser-based and can have many applications in biological sciences including fundamental physical investigations of cells and single molecules, drug delivery to a point of interest, and general pharmaceutical applications. The proposed devices can be used to enhance control and information throughput while miniaturizing device dimensions. Specific examples of applications of the disclosed technology include (but are not limited to):

- manipulation and detection of single biological molecules,
- detection and sensing of micro and nanoparticles,
- optical trapping of micro/nano particles,
- particle monitoring and counting,
- cell sorting and trapping
- bacteria sorting and trapping
- biochemical analysis (monitoring biochemical reaction using the apparatus)
- biosensing
- personalized medicine
- water quality evaluation
- pathogen detection
- transport and separation of biomolecules
- detection of viruses
- absorption spectroscopy of biomolecules
- enhancing the florescence for biomolecule and cell imaging
- enhancing the Raman sensing of biomolecules.

FIG. 9 shows another test device based on the design in FIG. 7. The device fabrication process began with patterning the waveguides using electron-beam lithography and plasma etching. All the waveguides had a width and thickness of 440 nm and 250 nm, respectively. In the next step, the region which would ultimately become the fluidic pool was protected by initially masking with a thin layer (~50 nm) of sputtered chromium (Cr). For this step, the entire device was first sputtered by Cr. Then using optical lithography and wet etching using Cr etchant, the Cr from the entire device except the fluidic region was removed. In the next step, the waveguides were clad with a 1 μm plasma-enhanced chemical vapor deposition (PECVD) oxide. The process was continued with two subsequent steps of lithography, metal evaporation, and lift-off to define the metal heater (Ni, 2.5 μm wide and 200 nm thick) and the contact electrodes (Al). Then, the entire device was covered by another 1.5 μm of oxide to isolate them from the fluid. In the next step, optical lithography and plasma etching removed the oxide cladding from the fluidic region and the etching stopped at the Cr interface. Then, using a Cr wet etchant, the thin Cr layer was removed from the fluidic region to expose the silicon waveguides in this region. A subsequent step of optical lithography and plasma etching removed the oxide from a portion of the Al contact electrodes and exposed them to the off-chip metal probes. Finally, the chip was integrated with a fluidic channel for fluid delivery.

For the experimental characterization of the device, tunable laser light (at 1550 nm, Ando AD4321Q) after being amplified by a laser amplifier (IPG Photonics) was coupled to the chip using an optical tapered lensed fiber. A polarization controller adjusted the light polarization for maximum coupling of light from the fiber to the transverse magnetic (TM) polarization mode of the waveguide. The transmitted light through the chip was collected from the opposite end of the chip using an additional tapered lensed optical fiber and ultimately sent to a photodetector. A microprobe (GBB Industries), for applying electric voltage, was connected to the contact electrodes of the microheater. The measured resistance of the microheater was about 300 ohms. The spectrum of the device was characterized by by sweeping the laser wavelength and monitoring the transmitted power through the chip using the photodetector (Thorlabs, PDB 150C). The optimal operation wavelength range is where the minimum light is transmitted to the output port of the device. This means that a standing-wave made of counter-propagating waves with nearly equal amplitudes has been formed in the trapping region.

For trapping experiments, polystyrene microspheres (Polysciences) with diameters of 356 nm or 490 nm in 20 mM Tris-HCl pH 8.0 were flowed into the microfluidic channel using syringe pumps controlled by a Harvard PhD 2000 pump. The spacing between traps in the nSWAT was experimentally determined to be 423 nm based on the distance between 356 nm beads in a packed array measured using image tracking (see below). To prevent beads from sticking to the device surfaces, we coated the sample chamber with lipids. Dehydrated lipids, 1,2-dioleoyl-sn-glycero-3-phosphocholine (DOPC), were suspended at a concentration of 1 mg/mL, in a buffer, containing 100 mM NaCl and 10 mM Tris, pH 8. The mixture was then sonicated for 5-10 mins to generate vesicles. This vesicle solution was then injected into the flow chamber of the device and incubated for 1 hour. During the incubation, the vesicles rupture on the device surface and self-assemble into a planar lipid bilayer.

The sample plane was imaged by a 100×, 1.3 NA oil-immersion objective (Nikon) using a JAI RM-6740GE camera with 7.4-micron squire pixels. Bead positioned were determined by fitting each circular Gaussian spot to the image of each bead in each frame. This allowed us to localized beads to better than 10 nm using one frame, and higher resolution was achieved by averaging over multiple frames. For stability measurements (FIG. 10a), images were acquired at 10 frames per second (FPS) and then data were averaged to 0.1 FPS, while stepping measurements (FIG. 10b) were acquired at 540 FPS and averaged to 10.8 FPS. In order to correct for drift of the sample relative to the camera, we also tracked the position of one edge of the nanophotonic device, and subtracted this displacement from all measured bead displacements. A rectangular region containing the device edge was manually selected in the first frame. The edge position was then tracked by cross-correlating subsequent images with the initial image.

The 10 kbp DNA template used in the experiments was prepared by creating the 10 kbp plasmid with high-copy number origin of replication by inserting a partial sequence of plasmid pRL574 and plasmid 601 into plasmid pYExt. The constructed 10 kbp DNA plasmid then was replicated in *E. coli* using standard plasmid cloning methods. The replicated plasmids were extracted and purified by using E.Z.N.A. Plasmid Mini Kit (Omega Bio-Tek), and cut with SapI (NEB) to produce nonpalindromic overhangs. A fill-in reaction with Klenow fragment (NEB), digoxigenin-11-dUTP and biotin-11-dATP (Roche) was used to label the linearized plasmid DNA. This resulted in one end of the DNA labeled with digoxigenin and the other end labeled with biotin. To form DNA dumbbells, 10 kbp DNA was mixed with both 490 nm streptavidin-coated microspheres and anti-digoxigenin-coated microspheres. The DNA, streptavidin-coated microspheres, and anti-digoxigenin-coated microspheres molar ratio was kept at 3:1:1, during incubation in a solution of 200 mM Tris buffer, pH 8.5, for 2-3 hours to obtain the maximal DNA dumbbell production efficiency.

Figure 11A:
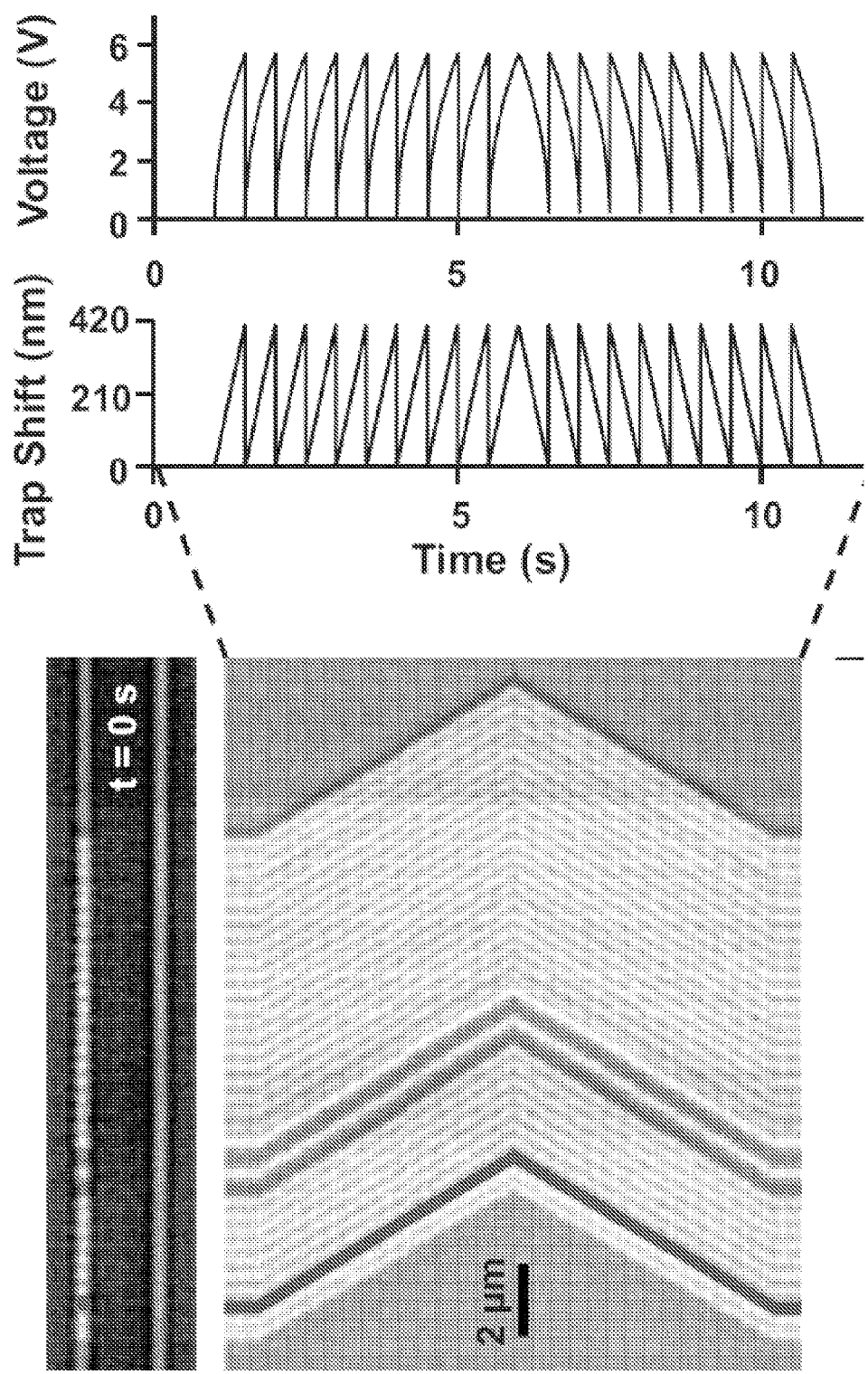
Figure 11B:
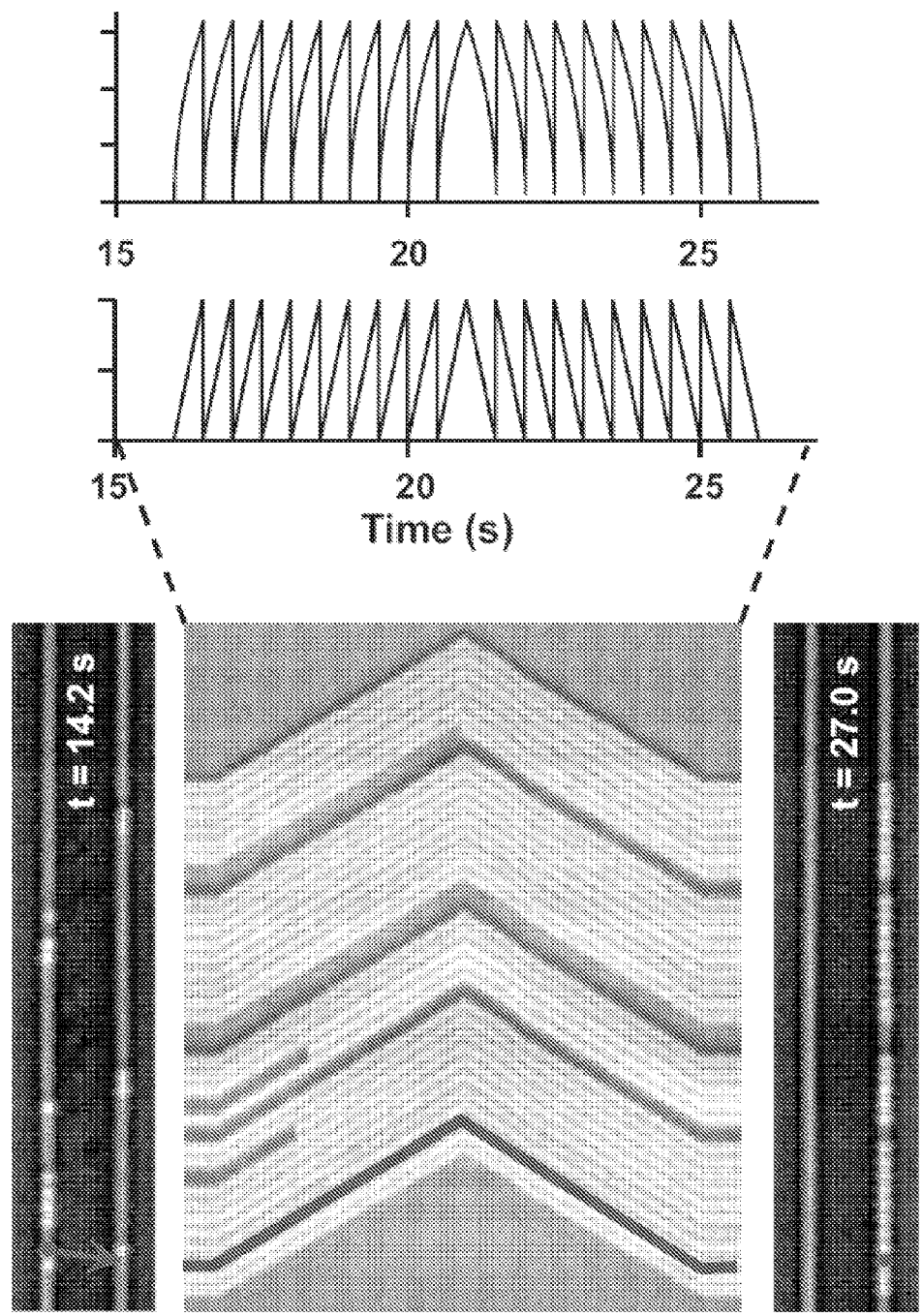
Figure 12:
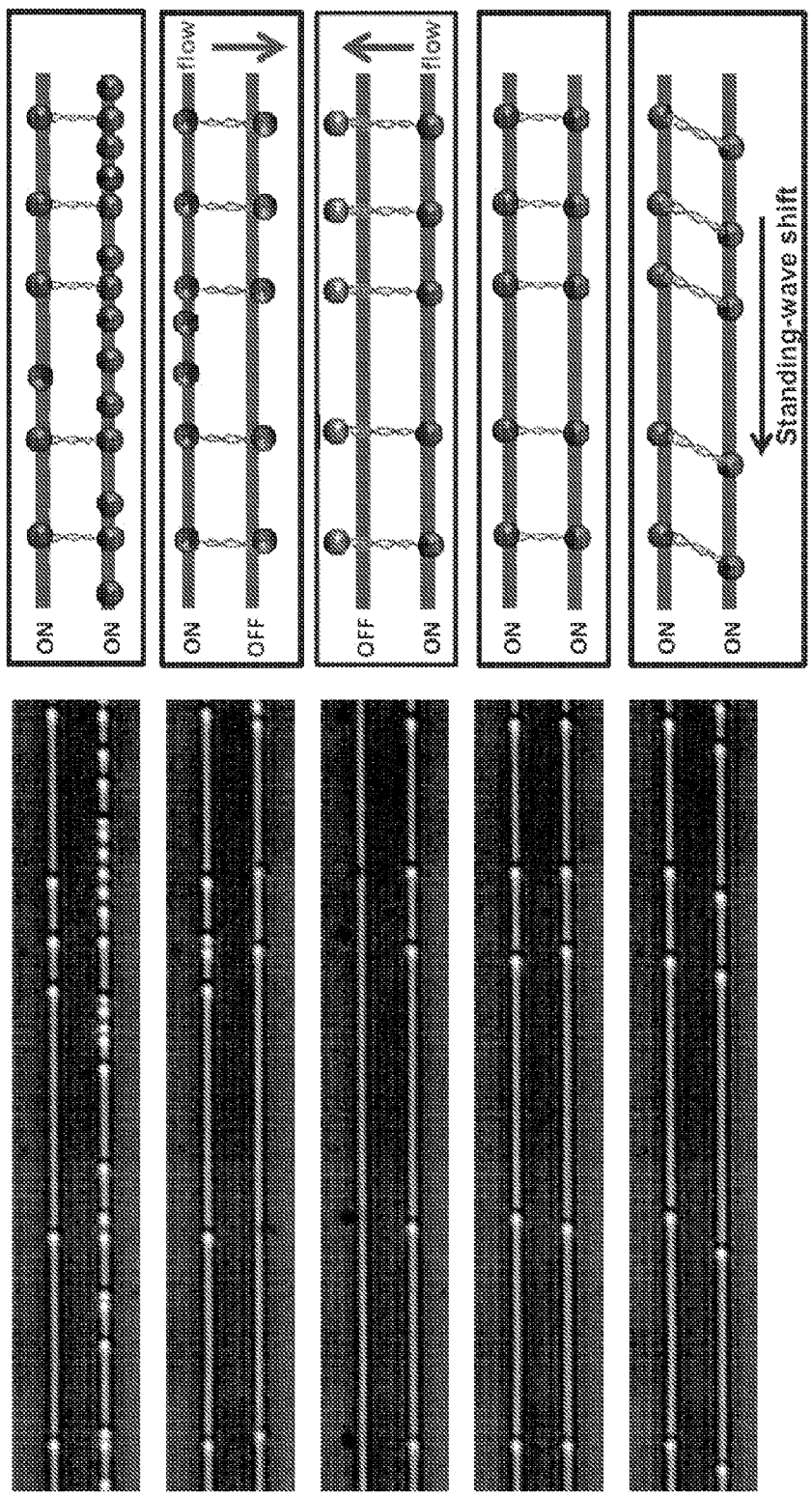

FIGS. 11A and 11B show controlled long range transportation by an nSWAT. An array of beads (356 nm in diameter, one false-colored) were initially trapped on the upper waveguide and transported in a controlled manner along the waveguide in both directions. Subsequently, laser power was switched from the upper to the lower waveguide using the Mach-Zehnder Interferometer (MZI) switch and beads were then trapped and transported along the lower waveguide. Each kymograph shows a line scan of an image of the active waveguide (horizontal axis) versus time (vertical axis), with the corresponding voltage applied to the microheater and the resulting phase shift of the standing wave plotted on the right.

FIG. 13 shows an example of sorting and manipulation of individual DNA molecules measured via the device in FIG. 9. The images on the left are video frames and the images on the right are illustrations explaining the steps in the process. DNA dumbbells were sorted by a combination of trapping and fluid flow forces. The sorted array of DNA molecules was extended by moving the traps of the lower nSWAT relative to those of the upper nSWAT in FIG. 9.

FIG. 14 shows a method for manipulating particles in a fluid based on optical trapping via evanescent fields of standing optical waves in optical waveguides. This method includes supplying a fluid having particles in a fluidic region on a substrate in which different optical waveguide sections are located to be in contact with the fluid; splitting an input optical beam into different optical beams into the different optical waveguide sections in such a way that each of the different optical waveguide sections has two counter-propagating optical beams that prorogate in opposite directions and interact with each other to form a standing optical wave to optically trap particles at or near a surface of each optical waveguide section; and controlling an amount of the optical phase delay of light at one or more locations on the substrate to cause a shift in locations of nodes of an optical standing wave in at least one optical waveguide section to change trapping locations of the trapped particles at the optical waveguide section.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A microfluidic device based on optical trapping of particles, comprising:
a substrate structured to include a fluidic channel which can carry a fluid having particles;
an optical waveguide loop formed on the substrate to include one or more waveguide sections that reside within the fluidic channel, an input optical port for the optical waveguide to receive an input optical beam, and an optical power splitter coupled to the optical waveguide loop to split the received input optical beam into two counter-propagating optical beams that prorogate in the optical waveguide loop in opposite directions and interfere with each other to form standing optical waves in at least the one or more waveguide sections that reside within the fluidic channel to optically trap particles at or near a surface of the one or more waveguide sections that reside within the fluidic channel; and
an electrically controllable phase control device formed on the substrate and coupled to a location of the optical waveguide loop and operable to control an optical delay experienced by guided light at the coupled location, wherein the electrically controllable phase control device is configured to respond to an electrical control signal to adjust an amount of the optical delay at the coupled location to cause a shift in locations of nodes of each optical standing wave to change trapping locations of the trapped particles in the fluidic channel.

2. The device as in claim 1, comprising:
a circuit formed on the substrate and coupled to the electrically controllable phase control device to supply the electrical control signal.

3. The device as in claim 1, comprising:
a light source on the substrate that produces the input optical beam.

4. The device as in claim 1, wherein:
the optical waveguide loop includes two waveguide sections that reside within the fluidic channel to optically trap particles at or near a surface of the one or more waveguide sections that reside within the fluidic channel.

5. The device as in claim 4, wherein:
the two waveguide sections that reside within the fluidic channel are close to each other in a way to enable to trap two particles that are coupled to each other, where one particle is trapped in one of the two waveguides and the other particle is trapped in another one of the two waveguides.

6. The device as in claim 5, wherein:
the two particles that are coupled to each other are coupled by a molecular bond.

7. The device as in claim 5, wherein:
the two particles that are coupled to each other are coupled by a DNA.

8. The device as in claim 4, wherein:
the two waveguide sections that reside within the fluidic channel are close to each other and are parallel to each other.

9. The device as in claim 4, in addition to the electrically controllable phase control device formed on the substrate and coupled to the optical waveguide loop, further comprising:
a second electrically controllable phase control device formed on the substrate and coupled to control a phase of light in a first of the two waveguide sections that reside within the fluidic channel; and
a third electrically controllable phase control device formed on the substrate and coupled to control a phase of light in a second of the two waveguide sections that reside within the fluidic channel.

10. The device as in claim 9, wherein:
one of the electrically controllable phase control devices includes a heater that heats up or cools down to change a phase.

11. The device as in claim 9, wherein:
one of the electrically controllable phase control devices includes an electro-optic region that locally changes a refractive index to change a phase.

12. The device as in claim 1, wherein:
the electrically controllable phase control device includes a heater that locally heats up or cools down the coupled location of the optical waveguide loop to change a refractive index in response to the electrical control signal.

13. The device as in claim 1, wherein
the electrically controllable phase control device includes an electro-optic region that locally changes a refractive index in the coupled location of the optical waveguide loop in response to the electrical control signal.

14. The device as in claim 1, wherein:
the substrate includes a substrate and a cladding layer formed over the substrate.

15. The device as in claim 1, wherein:
the substrate includes a silicon-on-insulator (SOI) structure.

16. The device as in claim 1, wherein:
the substrate includes a silicon nitride structure.

17. The device as in claim 1, wherein:
the substrate includes a silicon oxide structure.

18. The device as in claim 1, wherein:
the substrate includes materials and structures that are compatible with CMOS processing.

19. A microfluidic device based on optical trapping of particles, comprising:
a substrate structured to include a fluidic region which can contain a fluid having particles;
optical waveguides formed on the substrate to include (1) a first Mach-Zehnder interferometer that is located outside the fluidic region and receives an input laser beam and splits the received input laser beam into two laser beams along two different optical paths of the first Mach-Zehnder interferometer to produce a first optical beam; and (2) second Mach-Zehnder interferometers that are located inside the fluidic region and each receive a respective portion of light of the first optical beam output by the first Mach-Zehnder interferometer, wherein each second Mach-Zehnder Interferometer splits received light into two optical paths that are connected so that each optical path receives counter-propagating optical beams in opposite directions that interact with each other to form standing optical waves to optically trap particles;
a first electrically controllable phase control device formed on the substrate and coupled to a location of the first Mach-Zehnder interferometer and operable to control an optical delay between the two optical paths of the first Mach-Zehnder interferometer; and
second electrically controllable phase control devices formed on the substrate and coupled to the second Mach-Zehnder interferometers, respectively, each second electrically controllable phase control device operable to control an optical delay between the two optical paths of a respective second Mach-Zehnder interferometer.

20. The device as in claim 19, wherein:
two adjacent second Mach-Zehnder interferometers have a first waveguide section from a first of the two adjacent second Mach-Zehnder interferometers and a second waveguide section from a second of the two adjacent second Mach-Zehnder interferometers, and the first and second waveguide sections reside within the fluidic region and are close to each other in a way to enable to trap two particles that are coupled to each other, where one particle of the two coupled particles is trapped in the first waveguide section and the other particle is trapped in the second waveguide section.

21. The device as in claim 20, wherein:
the two particles that are coupled to each other are coupled by a molecular bond.

22. The device as in claim 20, wherein:
the two particles that are coupled to each other are coupled by a DNA.

23. The device as in claim 19, comprising:
a circuit formed on the substrate and coupled to control operations of the first and second electrically controllable phase control devices.

24. The device as in claim 19, wherein:
one of the electrically controllable phase control devices includes a heater that heats up or cools down to change a phase.

25. The device as in claim 19, wherein:
one of the electrically controllable phase control devices includes an electro-optic region that locally changes a refractive index to change a phase.

26. The device as in claim 19, wherein:
the substrate includes a substrate and a cladding layer formed over the substrate.

27. The device as in claim 19, wherein:
the substrate includes a silicon-on-insulator (SOI) structure.

28. The device as in claim 19, wherein:
the optical waveguides are silicon waveguides.

29. The device as in claim 19, wherein:
the fluidic region includes a microfluidic channel.

30. The device as in claim 19, wherein:
each of the second Mach-Zehnder interferometers includes an optical splitter to receive the input light and to split the input light into two beams into the two optical paths and a loop that connects the two optical paths.

31. A method for manipulating particles in a fluid based on optical trapping via evanescent fields of standing optical waves in optical waveguides, comprising:
supplying a fluid having particles in a fluidic region on a substrate in which different optical waveguide sections are located to be in contact with the fluid;
splitting an input optical beam into different optical beams into the different optical waveguide sections in such a way that each of the different optical waveguide sections has two counter-propagating optical beams that prorogate in opposite directions and interact with each other to form a standing optical wave to optically trap particles at or near a surface of each optical waveguide section; and
controlling an amount of the optical phase delay of light at one or more locations on the substrate to cause a shift in locations of nodes of an optical standing wave in at least one optical waveguide section to change trapping locations of the trapped particles at the optical waveguide section.

32. The method as in claim 31, wherein:
the controlling of the amount of the optical phase delay of light at one or more locations on the substrate includes controlling an optical phase delay of the light before splitting of the light into the waveguide sections.

33. The method as in claim 31, wherein:
the controlling of the amount of the optical phase delay of light at one or more locations on the substrate further includes, in addition to controlling an optical phase delay of the light before splitting of the light into the waveguide sections, controlling an optical phase delay at a particular waveguide section.

* * * * *